US012410049B2

(12) United States Patent
Ellsworth et al.

(10) Patent No.: US 12,410,049 B2
(45) Date of Patent: Sep. 9, 2025

(54) SOLVENT-BORNE PAINTS AND STAINS TINTABLE WITH WATER-ONLY COLORANTS

(71) Applicant: SWIMC LLC, Cleveland, OH (US)

(72) Inventors: Mark W. Ellsworth, Crestwood, KY (US); Benita L. Bush, Lebanon Junction, KY (US); Alison M. Collignon, Santa Claus, IN (US); Jacob S. Donlon, Prospect, KY (US); Mark R. Coward, Jeffersonville, IN (US)

( * ) Notice: Subject to any disclaimer, the term of this patent is extended or adjusted under 35 U.S.C. 154(b) by 701 days.

(21) Appl. No.: 17/585,958

(22) Filed: Jan. 27, 2022

(65) Prior Publication Data

US 2022/0144620 A1 May 12, 2022

Related U.S. Application Data

(63) Continuation of application No. 17/187,363, filed on Feb. 26, 2021, now Pat. No. 11,267,688, which is a
(Continued)

(51) Int. Cl.
| | |
|---|---|
| *C09D 7/63* | (2018.01) |
| *B67D 3/00* | (2006.01) |
| *C09D 7/20* | (2018.01) |
| *C09D 7/45* | (2018.01) |
| *C09D 17/00* | (2006.01) |
| *C09D 163/00* | (2006.01) |
| *C09D 167/00* | (2006.01) |

(Continued)

(52) U.S. Cl.
CPC ......... *B67D 3/0012* (2013.01); *B67D 3/0019* (2013.01); *C09D 7/20* (2018.01); *C09D 7/45* (2018.01); *C09D 7/63* (2018.01); *C09D 17/001* (2013.01); *C09D 175/06* (2013.01); *C09D 163/00* (2013.01); *C09D 167/00* (2013.01); *C09D 175/00* (2013.01)

(58) Field of Classification Search
CPC .. C09D 167/00; C09D 175/00; C09D 163/00; C09D 17/00
See application file for complete search history.

(56) References Cited

U.S. PATENT DOCUMENTS 2,878,135 A * 3/1959 Willis ................. C09D 17/002
106/499
3,042,259 A 7/1962 Eugel
(Continued)

FOREIGN PATENT DOCUMENTS

| BE | 898466 A | 6/1984 |
|---|---|---|
| CN | 1200136 A | 11/1998 |

(Continued)

OTHER PUBLICATIONS

US 5,841,144 A, 11/1998, Cresswell (withdrawn)
(Continued)

*Primary Examiner* — Rip A Lee
(74) *Attorney, Agent, or Firm* — Mueting Raasch Group

(57) ABSTRACT

A solvent-borne base paint or stain includes one or more polymeric binders, one or more pigments or dyes, one or more vehicles or carriers, and at least one synergist that will disperse water-only fluid colorants throughout the solvent-borne base paint or stain.

31 Claims, 5 Drawing Sheets

Related U.S. Application Data continuation of application No. 16/016,129, filed on Jun. 22, 2018, now Pat. No. 10,934,151.

(60) Provisional application No. 62/538,324, filed on Jul. 28, 2017.

(51) Int. Cl.
*C09D 175/00* (2006.01)
*C09D 175/06* (2006.01)

(56) References Cited

U.S. PATENT DOCUMENTS

| | | | |
|---|---|---|---|
| 3,074,597 A | 1/1963 | Felts | |
| 3,210,209 A | 10/1965 | Jones et al. | |
| 3,670,785 A | 6/1972 | Heiss et al. | |
| 4,089,699 A | 5/1978 | Blackburn et al. | |
| 4,427,835 A | 1/1984 | Bush et al. | |
| 4,442,256 A | 4/1984 | Miller | |
| 4,468,498 A | 8/1984 | Kowalski et al. | |
| 4,469,825 A | 9/1984 | Kowalski et al. | |
| 4,594,363 A | 6/1986 | Blakenship et al. | |
| 4,716,188 A * | 12/1987 | Mariusson | C09D 133/06 524/448 |
| 4,880,842 A | 11/1989 | Kowalski et al. | |
| 4,887,217 A | 12/1989 | Sherman | |
| 4,920,160 A | 4/1990 | Chip et al. | |
| 4,946,100 A | 8/1990 | Flemming et al. | |
| 4,985,064 A | 1/1991 | Redlich et al. | |
| 5,004,828 A | 4/1991 | Mathai | |
| 5,036,109 A | 7/1991 | Chip et al. | |
| 5,041,464 A | 8/1991 | Hoshino et al. | |
| 5,157,084 A | 10/1992 | Lee et al. | |
| 5,163,484 A | 11/1992 | Howlett et al. | |
| 5,184,783 A | 2/1993 | Hockmeyer et al. | |
| 5,297,697 A | 3/1994 | Boring | |
| 5,305,917 A | 4/1994 | Miller et al. | |
| 5,340,394 A * | 8/1994 | Elsamanoudi | C09B 67/0066 106/500 |
| 5,340,871 A | 8/1994 | Pearson | |
| 5,409,776 A | 4/1995 | Someya et al. | |
| 5,510,422 A | 4/1996 | Blakenship et al. | |
| 5,560,521 A | 10/1996 | Boring et al. | |
| 5,622,288 A | 4/1997 | Boring | |
| 5,814,144 A | 9/1998 | Coutts et al. | |
| 5,897,698 A * | 4/1999 | Bellas | C09D 17/003 523/171 |
| 5,934,513 A * | 8/1999 | Bellas | C09D 7/80 222/318 |
| 6,020,407 A | 2/2000 | Campbell et al. | |
| 6,221,145 B1 | 4/2001 | McClain | |
| 6,277,188 B1 * | 8/2001 | Salter | C09D 5/36 524/439 |
| 6,287,377 B1 * | 9/2001 | Binns | C09B 67/0085 106/419 |
| 6,448,366 B1 | 9/2002 | Santhanam et al. | |
| 6,488,760 B1 | 12/2002 | Binns et al. | |
| 6,701,977 B2 | 3/2004 | Taylor et al. | |
| 6,969,190 B1 | 11/2005 | McClain et al. | |
| 6,991,004 B2 | 1/2006 | Kaufhold et al. | |
| 7,250,464 B2 | 7/2007 | Friel et al. | |
| 7,659,340 B2 * | 2/2010 | Coward | C09C 1/3676 106/494 |
| 8,110,624 B1 | 2/2012 | Brandenburger et al. | |
| 8,141,599 B2 | 3/2012 | Korenkiewicz et al. | |
| 8,318,834 B2 | 11/2012 | Hefner, Jr. | |
| 8,328,930 B2 | 12/2012 | Tauber et al. | |
| 8,357,456 B2 * | 1/2013 | Ma | C08G 65/3322 427/407.1 |
| 8,528,605 B2 | 9/2013 | Smith | |
| 8,746,291 B2 | 6/2014 | Hertz et al. | |
| 8,748,550 B2 | 6/2014 | Cavallin et al. | |
| 8,752,594 B2 | 6/2014 | Gebhard | |
| 8,822,580 B2 * | 9/2014 | Korenkiewicz | C09D 5/028 524/436 |
| 9,080,030 B2 * | 7/2015 | Amiel | C08K 5/053 |
| 9,120,950 B1 | 9/2015 | Hinkley et al. | |
| 9,144,778 B2 | 9/2015 | Manicardi | |
| 10,577,512 B2 * | 3/2020 | Aitha | C09D 7/45 |
| 10,836,910 B2 * | 11/2020 | Wallace | C09D 7/63 |
| 10,933,389 B2 * | 3/2021 | Ellsworth | C09D 167/08 |
| 10,934,151 B2 | 3/2021 | Ellsworth et al. | |
| 11,267,688 B2 | 3/2022 | Ellsworth et al. | |
| 2005/0039635 A1 | 2/2005 | Yang | |
| 2005/0080171 A1 | 4/2005 | Reisacher et al. | |
| 2006/0165991 A1 | 7/2006 | Moril | |
| 2007/0055001 A1 | 3/2007 | Geursten et al. | |
| 2007/0055002 A1 | 3/2007 | Campbell et al. | |
| 2007/0084520 A1 | 4/2007 | Driessen | |
| 2007/0095421 A1 | 5/2007 | Page | |
| 2007/0244246 A1 | 10/2007 | Paczkowski et al. | |
| 2007/0266901 A1 | 11/2007 | Rance | |
| 2008/0139735 A1 | 6/2008 | Reisacher et al. | |
| 2008/0148995 A1 | 6/2008 | Lawlor et al. | |
| 2008/0227871 A1 | 9/2008 | Kim et al. | |
| 2008/0305241 A1 | 12/2008 | Trevino, III et al. | |
| 2009/0099695 A1 | 4/2009 | Trevino, III et al. | |
| 2009/0228143 A1 | 9/2009 | Hughes et al. | |
| 2011/0290375 A1 | 12/2011 | Hertz | |
| 2012/0316273 A1 | 12/2012 | Korenkiewicz | |
| 2013/0125790 A1 | 5/2013 | McLachlan et al. | |
| 2013/0276672 A1 | 10/2013 | Amiel | |
| 2013/0308219 A1 | 11/2013 | Kunimoto | |
| 2014/0299605 A1 | 10/2014 | Hertz | |
| 2016/0280939 A1 | 9/2016 | Olszanski et al. | |
| 2016/0333213 A1 | 11/2016 | Zhou et al. | |
| 2017/0051151 A1 | 2/2017 | Thommassen et al. | |
| 2017/0088723 A1 | 3/2017 | Sheerin et al. | |
| 2018/0010007 A1 | 1/2018 | Roland | |
| 2018/0223121 A1 * | 8/2018 | Reisacher | C09B 67/009 |
| 2019/0030502 A1 | 1/2019 | Ellsworth | |
| 2019/0031489 A1 | 1/2019 | Ellsworth | |
| 2022/0010148 A1 | 1/2022 | Donlon et al. | |

FOREIGN PATENT DOCUMENTS

| | | | |
|---|---|---|---|
| CN | 102083922 A | 6/2011 | |
| CN | 102741361 A | 10/2012 | |
| CN | 106661341 A | 5/2017 | |
| CN | 107429100 A | 12/2017 | |
| CN | 109306214 A | 2/2019 | |
| DE | 10204583 A1 | 8/2003 | |
| KR | 20160016077 A | 2/2016 | |
| WO | WO 1992/007913 A1 | 5/1992 | |
| WO | WO 93/09187 A1 | 5/1993 | |
| WO | WO 97/08255 A1 | 3/1997 | |
| WO | WO 00/22050 A1 | 4/2000 | |
| WO | WO 03/066743 A | 8/2003 | |
| WO | WO 2006/047238 A2 | 5/2006 | |
| WO | WO 2006/105348 A2 | 10/2006 | |
| WO | WO 2007/030382 A2 | 3/2007 | |
| WO | WO 2007/030626 A2 | 3/2007 | |
| WO | WO 2009/111479 A2 | 9/2009 | |
| WO | WO-2009106646 A1 * | 9/2009 | C08G 18/4294 |
| WO | WO 2010/091418 A1 | 8/2010 | |
| WO | WO 2011/084162 A1 | 7/2011 | |
| WO | WO 2012/130763 A1 | 10/2012 | |
| WO | WO 2015/165994 A2 | 11/2015 | |
| WO | WO 2015/188103 A1 | 12/2015 | |
| WO | WO 2016/040641 A1 | 3/2016 | |
| WO | WO 2016/066173 A1 | 5/2016 | |
| WO | WO 2016/161387 A1 | 10/2016 | |
| WO | WO 2017/029291 A1 | 2/2017 | |
| WO | WO 2017/125556 A1 | 7/2017 | |
| WO | WO-2018067829 A1 * | 4/2018 | |

OTHER PUBLICATIONS

Synthomer Solvent-based resins for coatings product guide; Mar. 2021. (Year: 2021).*

(56) References Cited

OTHER PUBLICATIONS

WorleeKyd SD 7003 Technical Leaflet; Jun. 23, 2022. (Year: 2022).*
ASTM D281-12, Standard Test Method For Oil Absorption of Pigments by Spatula Rub-Out, 2016.
ASTM D5326-94a, Standard Test Method for Color Development in Tinted Latex Paints, 2013.
ASTM D1483-12, Standard Test Method for Oil Absorption of Pigments by Gardner-Coleman Method, 2016.
ASTM D2244-16, Standard Practice for Calculation of Color Tolerances and Color differences from Instrumentally Measured Color Coordinates, 2017.
Baggen, Peter "Point-of-sale Tinting: Achieving cost-effective color variety," Paintindia. Dec. 2-12; 3 pgs, 2012.
BASF, "Pigments, pigment preparations, dyes and light stabilizers for coatings, plastics, printing inks and specialty industries", 156 pgs. Sep. 2007. Downloaded from: https://www.2.basf.us/additives/pdfs/color_brochure_plastics.pdf.
BASF, "Little Helpers Love Great Achievements-Formulation Additives by BASF," BASF SE Dispersions & Pigments Division. Retrieved on Aug. 28, 2019 from the internet, 2017; 76 pgs.
BASF® "More Flexibility with Xfast®!," BASF The Chemical Company, 8 pgs. 2008.
BASF, "Product Selection Guide, Pigments, pigment preparations, dispersions, resins and additives for the architectural coatings industry", 2013; 68 pgs.
Benjamin Moore®, "ECO SPEC® WB Interior Latex Flat Finish 373", Product Sheet, Jul. 2010;2 pgs.
"Color & Effects," Xfast® Easy Color Brochure, BASF The Chemical Company, 20 pgs. Feb. 2017.
Ellsworth, "Water-Only Colorants narrow the Gap to Solvent-Borne Performance," retrieved from the Internet, 2017.
Fed Test Method Std. 141D, "Paint, Varnish, Lacquer and Related Materials: Methods of Inspection, Sampling, and Testing," Mar. 22, 2001; 61 pgs.
Gonzáles-Gómez et al., "Dry Colour Dispensing," *European Coatings Journal*, Jun. 2005; pp. 24.
Koleske et al., " Additives Guide", *Paint and Coatings Industry*, Apr. 2003, pp. 12-86.
Louis C. et al., "Surfactant Influence on Colorant Acceptance," dated Mar. 21, 2016; 7 pgs. Downloaded from: https://www.coatingsworld.com/issues/2016-03-01/view_features/surfactant-influence-on-colorant-acceptance.
O'Hanlon, George, How to Make Oil Paint, Jun. 10, 2013; 15 pgs. Downloaded from the internet at www.naturalpigments.com/artist-materials/tutorial-how-make-paint.
Solvay Product Sheet—Rhodafac Rs 710. Retrieved on Aug. 28, 2019; downloaded from: https://www.solvay.com/en/product.rhodafac-rs-710, 2019.
"The Theory" *Benjamin Moore*, downloaded from: http://media.benjaminmoore.com/WebServices/prod/ColorStories/Theory_final.pdf, Dec. 24, 2012.
Van Havern, J., "Resins and additives for powder coatings and alkyd paints, based on renewable resources," *Coat Technol Res*, 2007;4(2)177-186.
"Product Selection Guide," BASF SE, 60 pgs. 2013.
"Color to Go," Xfast® POS, BASF The Chemical Company, 6 pgs. 2007.
NovoColor® HP, 8900 Line-Technical Data Sheet, CCA, 1 pg. Jun. 10, 2016.
Qunying, Li "Common Technical Manual for Coating Workers," Shanghai Science and Technology Press, Jul. 2008 55-56.

* cited by examiner

SOLVENT-BORNE PAINTS AND STAINS TINTABLE WITH WATER-ONLY COLORANTS

CROSS REFERENCE TO RELATED APPLICATIONS

This application is a continuation of U.S. application Ser. No. 17/187,363 filed Feb. 26, 2021 and entitled "TINTING WATER-BORNE AND SOLVENT-BORNE PAINTS AND STAINS WITH WATER-ONLY COLORANTS" (now U.S. Pat. No. 11,267,688), which is a continuation of U.S. application Ser. No. 16/016,129 filed Jun. 22, 2018 and entitled "TINTING WATER-BORNE AND SOLVENT-BORNE PAINTS AND STAINS WITH WATER-ONLY COLORANTS" (now U.S. Pat. No. 10,934,151 B2), which claims the benefit of U.S. Provisional Application No. 62/538,324 filed Jul. 28, 2017 and entitled "TINTING WATER-BORNE AND SOLVENT-BORNE PAINTS AND STAINS WITH WATER-ONLY COLORANTS", the disclosure of each of which is incorporated herein by reference in its entirety.

FIELD

This invention relates to point-of-sale customized-color architectural paint and stain tinting systems, such as those used in retail paint stores to make custom-tinted house paints or stains.

BACKGROUND

Architectural paint and stain manufacturers typically distribute premixed paints and stains in a small number of popular colors. To accommodate consumer desires and enable matching of existing painted or stained surfaces, manufacturers typically also distribute a set of tintable base paints or stains and several liquid colorants. These are combined at point-of-sale outlets using volumetric colorant dispensing equipment and shaker mixing equipment to make small batch lots of custom-tinted paint or stain in a much larger array of colors than the limited color array available in premixed products.

Owing in part to industry custom and the available colorant dispensing equipment, the custom color systems from different paint or stain manufacturers tend to have somewhat similar components. For example, a typical custom color paint system may employ several (e.g., 2 to 4) tintable base paints ranging for example from a bright white base that already contains a white pigment such as titanium dioxide and is intended to accept at most a small quantity of added colorant at the point-of-sale, to a relatively unpigmented clear base that is intended to accept a much larger quantity of added colorant at the point-of-sale. Base paints and stains may employ various binders (e.g., natural or synthetic resins), binder forms (e.g., solution polymers or latex polymers) and vehicles (e.g., solvent-borne or water-borne versions), and may provide various dried surface finishes (e.g., matte, semi-gloss or gloss finishes). Some manufacturers also sell colored base paints (e.g. a red, a blue and yellow colored base) which are intended to be combined with additional colorant(s) at the point-of-sale when strongly-tinted custom paint shades with one coat hiding power are desired. The colorants in custom color paint or stain systems may for example be volumetrically metered from a multiple-colorant dispensing station, with 12 to 20 paint or stain colorants typically being employed in colorant dispensing stations for the U.S. market, and more (e.g., 16 or 24 colorants) sometimes being employed in other markets.

Years ago, paints and stains were virtually all solvent-borne. Although solvent-borne paints and stains continue to be used, nowadays 80% or more of architectural paints and a significant proportion of stains are water-borne. The overall percentage of water-borne paints and stains as a proportion of total sales is expected to continue to increase. Despite that, some workers or customers continue to prefer solvent-borne paints (for example, alkyd paints) or solvent-borne stains in some end-use applications, and may do so well into the future.

Universal colorants have been developed for use in point-of-sale tinting equipment. Universal colorants typically are formulated by modifying a water-borne colorant formulation to include appropriate surfactants, and optionally to include appropriate dispersing agents or cosolvents, so that the colorant can tint either a water-borne or solvent-borne base paint or stain using the same tinting machine.

SUMMARY OF THE INVENTION

Unfortunately, the use of universal colorants requires compromises in paint performance in order effectively to bridge the colorant compatibility gap between water-borne and solvent-borne systems. For example, in water-borne paints tinted with universal colorants, the compromised performance factors may include one or more of higher volatile organic compound (VOC) content, surfactant leaching, increased tack, reduced blocking resistance and viscosity drop. For solvent-borne paints tinted with such colorants, the compromised performance factors may include one or more of longer drying time, reduced film hardness or altered gloss. Some point-of-sale paint stores use water-borne colorants to tint water-borne paints and stains, and employ a separate tinting machine containing solvent-borne colorants optimized for use with solvent-borne paints and stains. This solution is not ideal, since it requires investment in and maintenance of two tinting machines; requires the sale, storage and inventory of extra Stock Keeping Units (SKUs) representing the solvent-borne paint colorants; and may result in colorant shelf life expiration or dispenser plugging problems for less frequently used water-borne or solvent-borne colorants.

It would be desirable to provide a point-of-sale universal tinting system that could be used with either water-borne or solvent-borne paints and stains, without unduly compromising the performance of the resulting custom-tinted paint or stain products, and without requiring separate tinting machines and separate colorant arrays. We have found that by employing a paint tinting system utilizing water-borne and solvent-borne paint or stain bases, an array of water-only fluid colorants, and a synergist containing, primarily or exclusively, ingredients that will assist in dispersing the water-only colorants into solvent-borne paints or stains, we can reduce or eliminate the above-mentioned performance compromises, and avoid the need to purchase and maintain separate tinting machines and separate colorant arrays.

The synergist may be a liquid, powdered solid, or a dispersible solid object such as a compressed pill or tablet. The synergist may be introduced into a solvent-borne base paint or stain in a variety of ways, and may be introduced before, together with or (less preferably) after introduction of one or more water-only fluid colorants into such solvent-borne base paint or stain. In one embodiment, the synergist may be supplied in a cartridge, canister or other standard container of the type normally used for liquid colorants, disposed in one of the tinting machine dispenser slots normally reserved for a colorant, and dispensed into the base paint or stain using the tinting machine metering circuit. In another embodiment, the synergist may be dispensed into a solvent-borne base paint or stain using a separate, "bolt-on" dispensing system. Such a bolt-on system optionally may have lower precision than the tinting machine colorant metering circuit, as the amount of synergist to be employed does not need to be controlled as precisely as the colorant amount. In yet another embodiment, an in-store technician may separately add the synergist at the point-of-sale to a solvent-borne paint or stain (for example as a pill, tablet, sachet or other dispersible or dissolvable pouch, or as a pour-in powdered product). In a further embodiment, a paint or stain manufacturer may add or include the synergist to or in a base paint or stain at a factory, warehouse or other non-retail site prior to delivery to a point-of-sale retail, wholesale or combined retail/wholesale outlet. The system can accordingly be used with just the water-only colorants when it is desired to tint a water-borne paint or stain, and can be used with such colorants together with an appropriate amount of the synergist when it is desired to tint a solvent-borne paint or stain.

Because the synergist only needs to be used for tinting solvent-borne paints or stains, the ingredients (e.g., the surfactants, optional dispersing agents and optional cosolvents) in the synergist may be chosen to optimize the performance of the tinted solvent-borne paint or stain alone, and without regard to their potential impact on water-borne paint or stain performance.

The invention thus provides, in one aspect, a point-of-sale custom color system for tinting base paints and stains, the system comprising:

a) an array of water-only fluid colorants including at least white, green, blue and red colorants, the colorants being packaged in containers with a volume of about 0.5 to about 5 L and from which colorant may be gravimetrically or volumetrically dispensed via an automated or manual colorant dispenser into the base paint or stain; and b) at least one synergist containing, primarily or exclusively, one or more ingredients that will disperse the water-only colorants into solvent-borne base paints or stains.

In an embodiment, the above point-of-sale custom color system also includes at least one water-borne base paint or stain and at least one solvent-borne base paint or stain, the base paints or stains being packaged in largely but incompletely filled point-of-sale containers with a volume of about 0.2 to 20 L equipped with an openable and recloseable lid, cap or other closure for an opening through which colorant may be dispensed from the automated or manual colorant dispenser into the base paint or stain.

In a further embodiment, the above point-of-sale custom color system also includes the automated or manual colorant dispenser.

The invention provides, in another aspect, a point-of-sale custom color system for tinting base paints and stains, the system comprising:

a) an array of water-only fluid colorants including at least white, green, blue and red colorants, the colorants being packaged in containers with a volume of about 0.5 to about 5 L and from which colorant may be gravimetrically or volumetrically dispensed via an automated or manual colorant dispenser into the base paint or stain; and b) at least one water-borne base paint or stain and at least one solvent-borne base paint or stain, the base paints or stains being packaged in largely but incompletely filled point-of-sale containers with a volume of about 0.2 to 20 L equipped with an openable and recloseable lid, cap or other closure for an opening through which colorant may be dispensed from the automated or manual colorant dispenser into the base paint or stain, wherein the solvent-borne base paint or stain includes a synergist in the form of one or more ingredients that will disperse the water-only colorants into such solvent-borne base paint or stain.

In an embodiment, the latter point-of-sale custom color system also includes the automated or manual colorant dispenser.

The invention provides, in another aspect, a method for point-of-sale custom paint or stain tinting, the method comprising using an automated or manual colorant dispenser to dispense into water-borne and solvent-borne base paints or stains at a retail, wholesale or combined retail/wholesale outlet one or more water-only fluid colorants selected from an array of colorants including at least white, black, red, green and blue water-only colorants, and further comprising adding to or including in the solvent-borne base paints or stains at least one synergist containing one or more ingredients that will disperse the water-only colorants into such solvent-borne base paints or stains.

The disclosed system and method permit point-of-sale formulation and sale of both water-borne and solvent-borne custom-tinted paints and stains using a single tinting machine and a single colorant array, while avoiding or minimizing added inventory, dedicated dispensers or dedicated floor space.

This application is related to application Ser. No. 16/016,179 filed Jun. 22, 2018 and entitled "TINTING WATER-BORNE AND SOLVENT-BORNE PAINTS AND STAINS WITH POWDERED COLORANTS" (scheduled to issue Mar. 2, 2021 as U.S. Pat. No. 10,933,389 B2), the disclosure of which is incorporated herein by reference.

BRIEF DESCRIPTION OF THE DRAWING

Like reference symbols in the various figures of the drawing indicate like elements. The elements in the drawing are not to scale.

DETAILED DESCRIPTION

Figure 1:
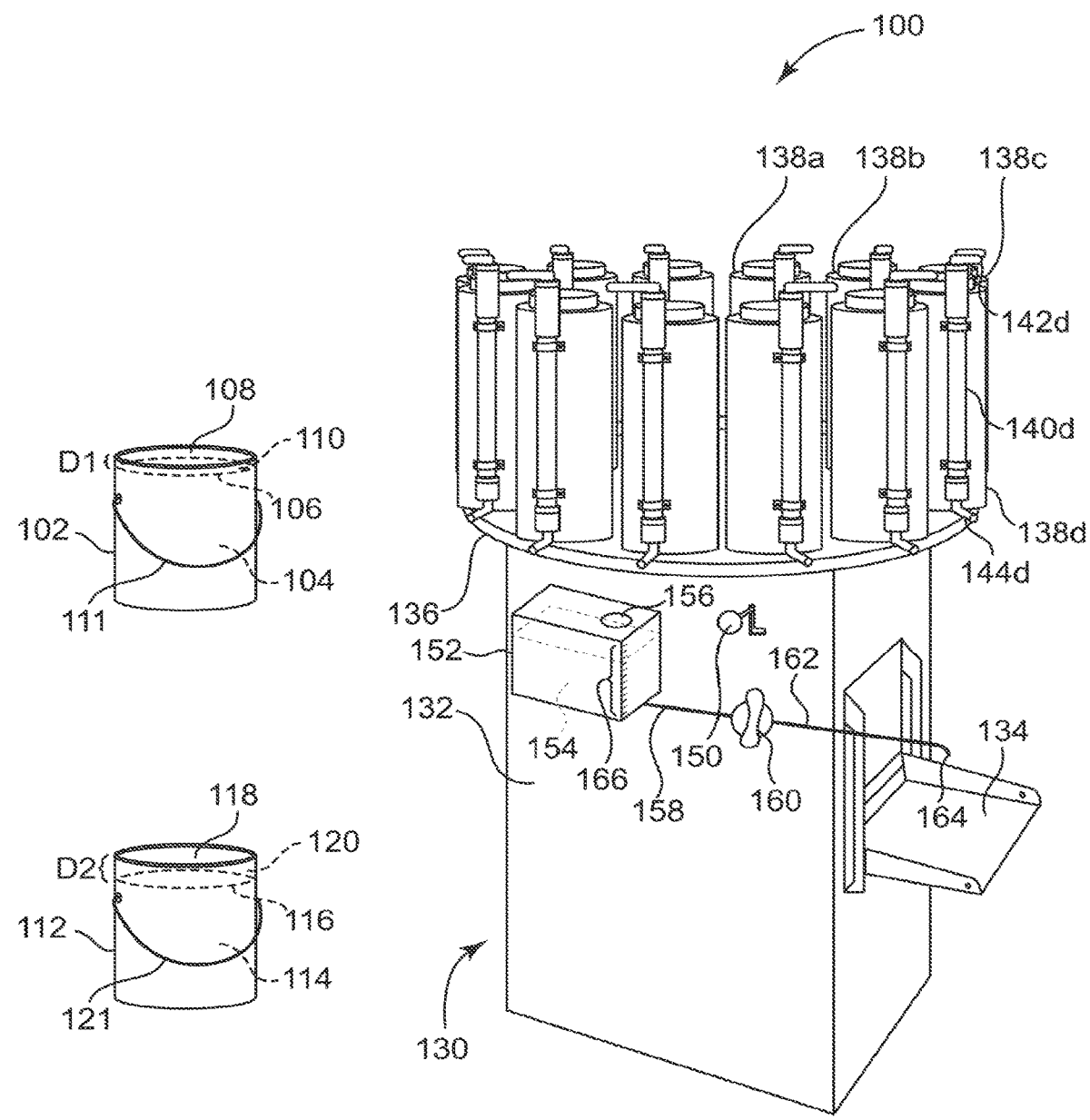
FIG. 1 and FIG. 2 are perspective views of embodiments of the disclosed paint or stain tinting system.

Unless the context indicates otherwise the following terms shall have the following meaning and shall be applicable to the singular and plural:

The terms "a," "an," "the," "at least one," and "one or more" are used interchangeably. Thus, for example, a system or method that includes "a" synergist means that the system or method may include "one or more" synergists.

The terms "architectural paints" and "architectural stains" respectively mean paints and stains for use on interior or exterior building or construction surfaces, e.g., walls, trim, floors, decks, railings, ceilings, roofs (including metal roofing, shingles and tiles), roadways, sidewalks, etc.

The term "array" when used with respect to colorants means an assortment of colorants intended to be used individually or in appropriate combinations to tint base paints or stains so as to provide user-customized colors in a wide gamut of hues. A typical array will normally contain at least white, green, blue and red colorants, and usually will also contain one or more black colorants, one or more yellow colorants and one or more oxide colorants such as red oxide or yellow oxide. The individual colorants in a typical array will normally be supplied by a single manufacturer, be packaged in similar containers, bear similar labels each having a distinct SKU identifier, and may bear a unifying trademark for the array or for the brand of paint or stain with which the array is intended to be used.

The term "automated colorant dispenser" means a dispenser for paint or stain colorants which is controlled or controllable via electronically-regulated precision gravimetric weighing or volumetric metering devices so as to dispense controlled quantities of one or more colorants (e.g., water-only colorants) into a base paint or stain container and thereby facilitate preparation of tinted paints or stains whose tints are selected from an array of tints. The colorant types and amounts selected by such an automated colorant dispenser will optionally and preferably be controlled using software and a suitable database.

The term "base paint or stain" means a water-borne or solvent-borne paint or stain product packaged in a largely but incompletely filled point-of-sale container with a volume of about 0.2 to 20 L equipped with an openable and recloseable lid, cap or other closure, and which may be used as is but normally will be tinted at the point-of-sale by adding one or more colorants to the paint or stain product in its container, and stirring, shaking or otherwise mixing the container contents to disperse the colorant throughout the base paint or stain product.

The term "binder" means a film-forming natural or synthetic polymer suitable for use in a paint or stain.

The term "colorant" means a composition that can be added to (e.g., dispensed into) a point-of sale container whose interior volume is largely (e.g., two thirds of the container volume or more) but not completely already filled with a base paint or stain so as to alter the hue or lightness of such base paint or stain, and which contains pigment or dye and an optional vehicle but is substantially free of binder.

The term "custom-tinted" when used with respect to a system or method for tinting base paints or stains means that one or more colorants can be dispensed into a base paint or stain and mixed to provide finished paint or stains in a wide variety of (e.g., more than one hundred or even more than one thousand) preselected formulated colors or, if desired, a match for randomly-selected colors. The preselected formulated colors will ordinarily be viewed by potential end users using printed color charts or displayed computer images.

The term "headspace" when used with respect to a base paint or stain in an openable container refers to an unfilled small portion of the total container volume (for example, about 1% to about 33%, and in some embodiments about 1% to about 15%, of the total container volume) available for and intended to be used for colorant addition.

The term "liquid" when used to describe a material that can exist in several different phases refers to the phase occupied by that material at room temperature (23° C.) and 1 atm.

The term "manual colorant dispenser" means a non-automated dispenser for paint or stain colorants which is equipped with manually-movable pistons whose strokes have been indexed to manually meter quantities of one or more colorants into a base paint or stain container and thereby facilitate preparation of tinted paints or stains whose tints are selected from an array of tints.

The term "NVM" is an abbreviation for non-volatile materials, and refers to a material that does not significantly evaporate at standard temperature and pressure. NVM content may be evaluated using ASTM D1353-13.

The term "paint" means a coating composition including pigment and binder which when applied to form a thin (e.g., 100 μm) wet thickness coating film on a freshly-sanded smooth wood surface, will when dried hide or substantially hide the wood grain and will present a new surface with its own appearance.

The term "pigment" includes both colored, dispersible solid particulate materials and colored dispersible or soluble dye materials, wherein the material imparts visually noticeable color to a base paint or stain when 5 wt. % (in the case of a colored, dispersible solid particulate) or 0.05 wt. % (in the case of a colored, dispersible or soluble dye) of the material is added to (e.g., dispensed into) the base paint or stain. The presence or absence of visually noticeable color may be assessed by preparing drawdown samples of the base paint or stain with and without the pigment, casting such samples as 25 μm dry thickness coated films over the white part of a BYK-Gardner No. PA-2811 opacity drawdown chart (from BYK-Gardner USA) or comparable chart, and examining the coated films under normal overhead interior illumination.

The term "pigment volume concentration" when used in respect to a paint, stain or colorant means the total percentage of dried coating volume occupied by all pigment species in the coating.

The terms "point-of-sale" and "retail" when used with respect to a site, location, store or other outlet means a place at which custom-mixed paints or stains are tinted and mixed in small batch lots (e.g., one half pint, one pint, one quart, one liter, one gallon, four liter, five gallon or 20 liter containers, corresponding to containers from about 0.2 to 20 L) for sale to end-users (e.g., painters, builders and homeowners). Representative point-of-sale retail, wholesale or combined retail/wholesale outlets include paint stores, hardware stores, building supply stores (including warehouses), and distribution centers.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "primarily or exclusively", when used with respect to the amount of an ingredient or ingredients in a synergist, means in the case of the word "primarily" that the named ingredient or ingredients represent at least 50 wt. % of the ingredients in such synergist, excluding any solvent or other carrier (e.g., water) that may be present in the synergist. In some embodiments the named ingredient or ingredients may represent at least 60 wt. %, at least 70 wt. %, at least 80 wt. % or at least 90 wt. % of the ingredients in such synergist, excluding such solvent or other carrier. In the case of the word "exclusively", the synergist consists essentially of or consists of such named ingredient or ingredients, excluding such solvent or other carrier.

The term "solid" when used to describe a material that can exist in several different phases refers to the phase occupied by that material at room temperature (23° C.) and 1 atm.

The term "solvent-borne" when used in respect to a paint, stain or colorant means that the major liquid vehicle or carrier for the paint, stain or colorant is a nonaqueous solvent or mixture of nonaqueous solvents.

The term "stain" means a coating composition including binder which when applied to form a thin (e.g., 100 μm) wet thickness coating film on a freshly-sanded smooth wood surface, will when dried not hide both the wood grain and its texture. When a semi-transparent stain is applied to wood, the wood grain and its texture normally both remain noticeable, whereas when a solid color (viz., opaque) stain is applied the grain normally becomes hidden while the texture normally remains noticeable. A stain typically will soak into a wood or other porous substrate (e.g., concrete) to a much greater extent than will a paint.

When used with respect to a component which may be found in a paint, stain or colorant composition, the term "substantially free of" means containing less than about 1 wt. % of the component based on the composition weight.

The terms "tint strength" and "tinting strength" refer to the value obtained using ASTM D 3022-84 (Reapproved 2005), Standard Test Method for Color and Strength of Color Pigments by use of a Miniature Sandmill, and calculated using the Kubelka-Monk equation for tinting strength set out in Section 8.4.4 of the ASTM Test Method. Preferably the measurements are obtained using spectrophotometric instrumentation such as Datacolor TOOLS™ software and a Datacolor SPECTRAFLASH™ SF300 or similar spectrophotometer, a D65 illuminant, CIE 1964 10° Standard Observer angle and reflectance mode.

The term "uncolored" when used with respect to a synergist means that the synergist does not contain visually noticeable quantities of pigment. A synergist may however have its own inherent color, such as the yellow coloration sometimes found in amine group-containing surfactants.

The term "water-borne" when used in respect to a paint, stain or colorant means that the major liquid vehicle or carrier for the paint, stain or colorant is water.

The term "water-only" when used with respect to a fluid (viz., liquid) colorant means that the colorant can be used to tint a water-borne base paint or stain, but exhibits objectionable rub-up (viz., unsatisfactory compatibility) when added by itself in an attempt to tint a conventional solvent-borne paint (such as Ace™ Royal™ polyurethane alkyd enamel from Ace Hardware Co., Item No. 245A320) or a conventional solvent-borne stain (such as Cabot™ Semi-Transparent deck and siding stain No. 0306 from The Valspar Corporation). Rub-up may be evaluated using the Rub-Up Test shown below in the Examples section. Objectionable rub-up may for example correspond to less than a 6 pass score or more than a moderate dark rating in the Rub-Up Test. A skilled paint tinting technician would regard a water-only colorant as being a "non-universal" colorant, and would regard a universal colorant as not being a water-only colorant.

The recitation of a numerical range using endpoints includes all numbers subsumed within that range (e.g., 1 to 5 includes 1, 1.5, 2, 2.75, 3, 3.80, 4, 5, etc.).

FIG. 1 shows a perspective view of an embodiment 100 of the disclosed paint and stain mixing system. Container 102 holds a liquid water-borne base paint or stain 104. The upper surface 106 (shown in phantom view) of base paint or stain 104 is located a sufficient distance D1 below container lid 108 so that a headspace 110 is available for the addition of one or more colorants to prepare a custom-tinted water-borne paint or stain with a custom hue. Handle 111 may be used to carry container 102. Container 112 holds a liquid solvent-borne base paint or stain 114. The upper surface 116 (also shown in phantom view) of base paint or stain 114 is located a sufficient distance D2 below container lid 118 so that a headspace 120 is available for the addition of one or more colorants to prepare a solvent-borne paint or stain with a custom hue. Distance D2 may be greater than, less than or the same as distance D1, and will depend on the amount of colorants already present in base paints or stains 104 and 114 and the expected amount of colorant(s) that might need to be dispensed into base paints or stains 104 and 114 to obtain satisfactory final hues. Handle 121 may be used to carry container 112. The disclosed system and method may optionally employ a further base or bases (not shown in FIG. 1), for example a clear water-borne or solvent-borne base paint or stain for making deep colored custom tints.

Base paint or stain containers 102 and 112 may be combined with colorant, and synergist may be added to solvent-borne base paint or stain 114, using manual colorant dispenser 130. Dispenser 130 includes cabinet 132 on which is mounted shelf 134 where containers 102 or 112 may be placed for colorant addition, and in the case of container 112 for synergist addition. Turntable 136 includes a series of refillable colorant or synergist dispenser canisters (twelve in this case, four of which are numbered as 138a, 138b, 138c and 138d) containing a point-of-sale array of liquid colorants in most of the canisters and synergist in one or more of the remaining canisters. For example, the synergist may be contained in canister 138a, and colorants may be contained in canisters 138b, 138c and 138d and the other unnumbered canisters on turntable 136. Alternatively, for example if it is desired to use all available turntable positions for colorant addition, the synergist may be dispensed into solvent-borne base paint or stain 114 using a separate bolt-on dispenser. An exemplary such dispenser is represented by reservoir 152 which contains synergist 154 (shown in phantom view) and which is closed by removable cap 156. Reservoir 152 may be refilled by removing cap 156 and pouring additional synergist into reservoir 152. Outlet conduit 158, manually-operated valve 160 and dispensing spout 162 may be used to dispense synergist into container 112 from spout 164. The amount of synergist that has been added to container 112 may be estimated using index marks 166 or by noting the change in the content level within container 112 during synergist addition. The synergist volume may also be metered by valve 160, for example by providing a hollow chamber in valve 160 holding a specified amount (for example, 0.5 fluid ounce or 14.8 mL) and configuring valve 160 so that the entire contents of the chamber are dispensed from spout 164 when the handle on valve 160 is rotated one full turn. Additional turns can be used to dispense additional synergist. A typical synergist addition to a 1 gallon (3.78 L) base paint or stain container will be about 2 fluid ounces (about 59 mL), and need not be as precisely measured as when adding colorants. Thus for a valve 160 configured as described above, a single turn of the valve handle might be used to dispense sufficient synergist into a 1 quart (0.946 L) container holding a solvent-borne paint or stain, and four full turns might be used to dispense sufficient synergist into a 1 gallon (3.78 L) container holding such paint or stain.

When tinting a water-borne base paint or stain such as base paint or stain 104, the synergist preferably is not employed. When tinting a solvent-borne base paint or stain such as base paint or stain 114, the synergist is usually or always employed together with one or more colorants, and is omitted only when the volume or type of colorant is such that compatibility problems will not be expected to arise. By way of example, canister 138d includes a metered dispensing cylinder 140d containing a piston and connecting link (neither of which is shown in FIG. 1) joined to movable handle 142d whose position can be adjusted vertically along cylinder 140d to provide for the metered delivery of colorant or synergist from canister 138d through dispensing outlet 144d and into a container such as base paint or stain container 102 or 112 placed on shelf 134. The remaining canisters include similar but unnumbered metered dispensing cylinders, pistons, connecting links, handles and dispensing outlets. Release lever 150 permits turntable 136 to be rotated as needed to bring each colorant or synergist canister in line above shelf 134 and locked into place while colorant or synergist is metered and dispensed into a base paint or stain container. The amount and type of synergist that will be dispensed into a solvent-borne base paint or stain may in the interest of simplicity be the same whenever a solvent-borne base paint or stain is tinted. In other embodiments, the amount or type of synergist(s) may be varied depending on the amount of colorant to be added (viz., more synergist or another synergist may be employed when a dark or deep tint is prepared, and less synergist or another synergist may be employed when a light pastel tint is prepared), the type of colorant to be added (viz., more synergist or another synergist may be employed when a green or blue tint is prepared, and less or no synergist may be employed when a black or yellow tint is prepared), or both the amount and type of colorant to be added. The amount or type of synergist(s) may also be varied depending upon the chosen solvent-borne base paint or stain. Preferably the synergist(s) are added prior to the addition of colorants, but this is not required.

Figure 2:
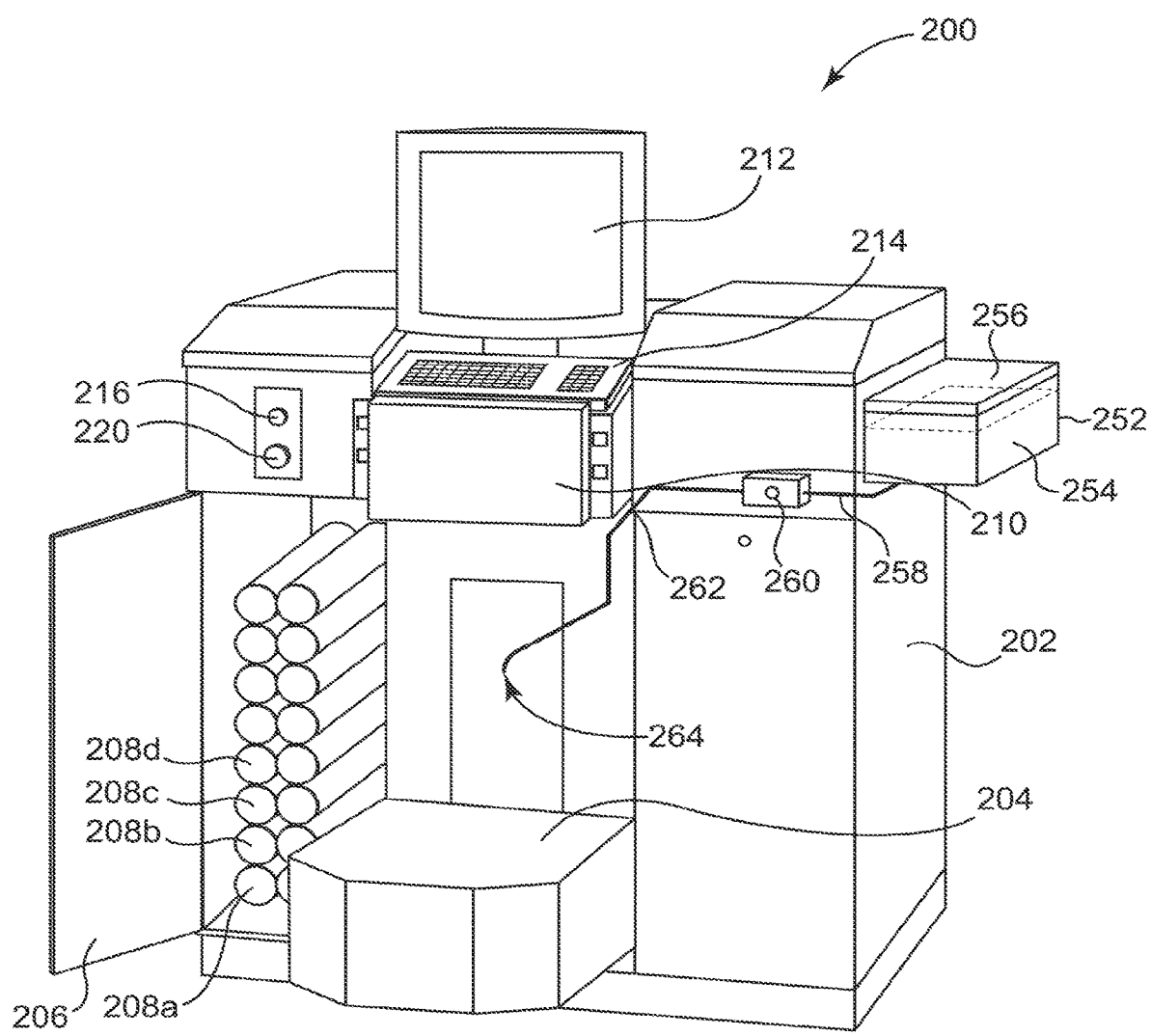
Figure 2:
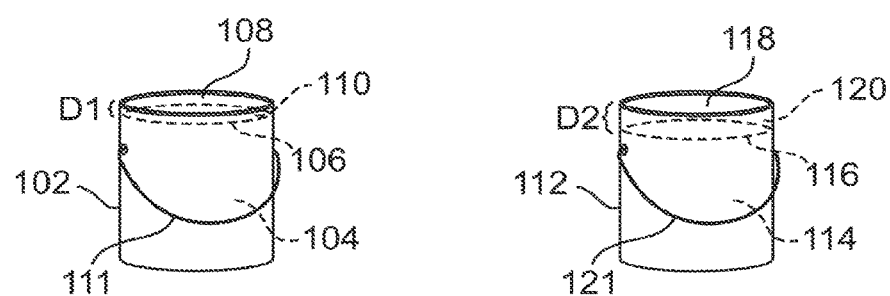

FIG. 2 shows a perspective view of an embodiment 200 of the disclosed paint and stain mixing system. Base paint or stain containers 102 and 112 are as in FIG. 1. Containers 102 and 112 may be combined with colorant, and synergist may be added to container 112, using automated colorant dispenser 202. Dispenser 202 includes a shelf 204 where containers 102 or 112 may be placed for colorant or synergist addition. Cabinet 206 holds a series of replaceable colorant or synergist dispenser canisters (sixteen in this case, four of which are numbered as 208a, 208b, 208c and 208d) containing a point-of-sale array of liquid colorants in most of the canisters and one or more synergists in one or more remaining canisters. Colorant or synergist is dispensed from the appropriate canister through suitable internal plumbing in cabinet 206 (not shown in FIG. 2) and suitable dispensing nozzles (not shown in FIG. 2) positioned in dispensing head 210, and thence into a base paint or stain container. Alternatively, the synergist may be dispensed into solvent-borne base paint or stain 114 from a separate bolt-on dispenser. An exemplary such separate dispenser is represented by reservoir 252 which contains synergist 254 (shown in phantom view) and includes removable cover 256 to permit refilling of reservoir 252. Outlet conduit 258, electrically-operated metering valve 260 and dispensing spout 262 may be used to dispense synergist into container 122 from spout outlet 264. A microprocessor or other control device (not shown in FIG. 2) may be used to meter the amount of synergist added to container 112. A monitor 212 and keyboard 214 permit information and commands to be entered into dispenser 202. A barcode reader (not shown in FIG. 2) may be used to read information from paint or stain sample cards or base paint or stain containers to assist in controlling the system. A power button 216 and emergency off button 220 may be used to start and stop dispenser 202 and valve 260. As is the case for the embodiments shown in FIG. 1, the amount or type of synergist(s) may be varied depending on the amount or type of colorant to be added. In addition, and as is the case for the embodiments shown in FIG. 1, the amount or type of synergist(s) may also be varied depending upon the chosen solvent-borne base paint or stain. Such variations in the amount or type of synergist(s) will generally be much more easily and reliably accomplished in an automated colorant dispenser like that shown in FIG. 2 then in a manual colorant dispenser like that shown in FIG. 1.

Figure 3:
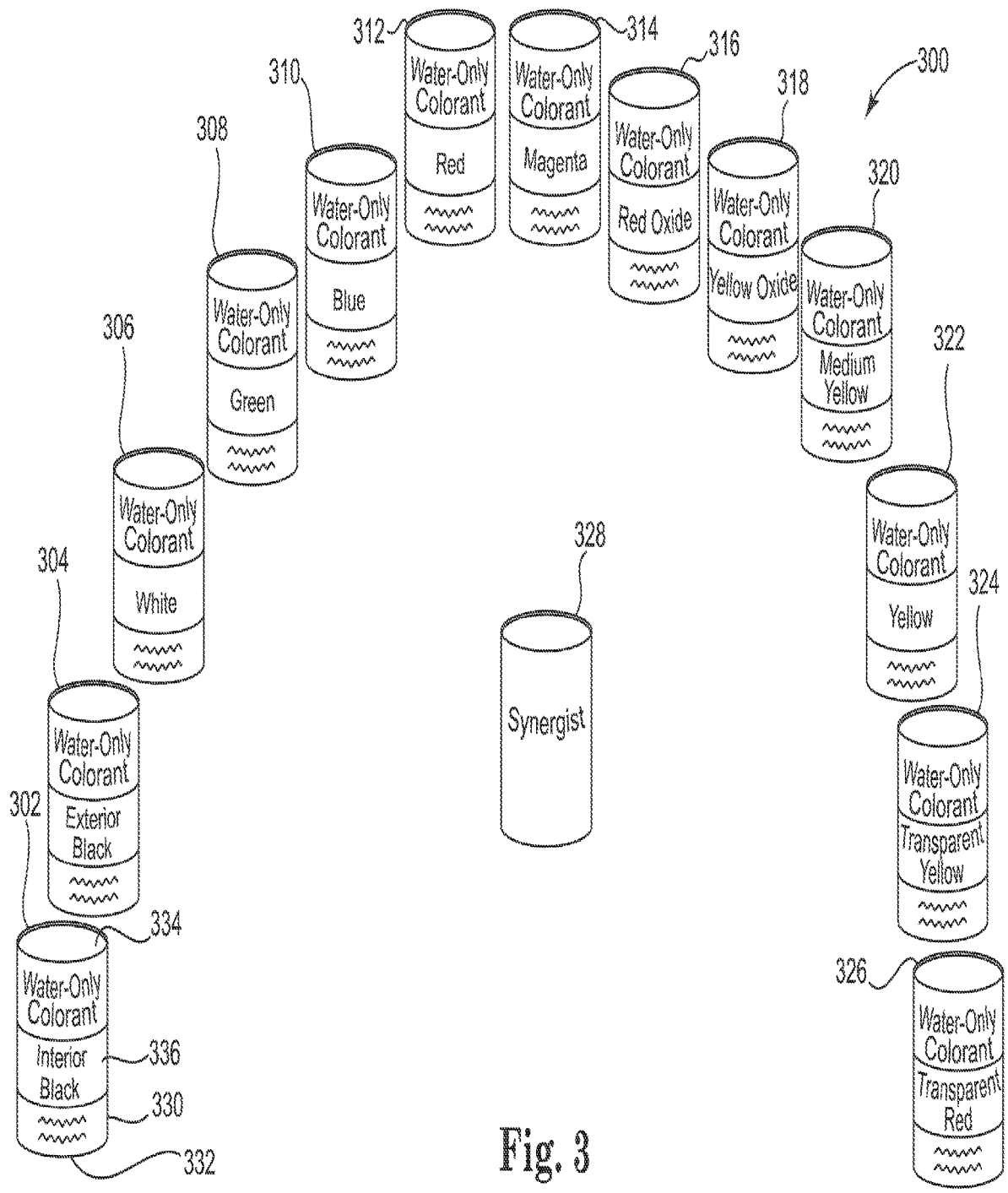
FIG. 3 is a schematic view of an embodiment of the disclosed colorant array and the disclosed synergist.

FIG. 3 is a perspective view of a point-of-sale colorant array 300 with thirteen containers 302 through 326 containing water-only fluid colorants in different hues. In the center of FIG. 3 is a fourteenth container designated 328 and containing a synergist. Although not shown in FIG. 3, the corresponding point-of-sale custom color system will also include one or more water-borne paint or stain bases like base 102 in FIG. 1 and FIG. 2, and one or more solvent-borne paint or stain bases like base 112 in FIG. 1 and FIG. 2. Container 302 is representative of the other containers in FIG. 3, includes side 330, bottom 332, top 334 and label 336, and may for example contain a water-only liquid colorant such as a carbon black dispersion for use in tinting interior paints. Top 334 preferably is puncturable, shearable or otherwise penetrable, and may resemble the top used in soup cans. Container 304 contains a different water-only liquid colorant such as a dispersion of a non-infrared-absorptive black colorant for use in tinting exterior paints. Containers 306 through 326 contain additional water-only fluid colorants, which in the embodiment shown in FIG. 3 respectively are white, green, blue, red, magenta, red oxide, yellow oxide, medium yellow, yellow, transparent yellow and transparent red colorants. The colorants in containers 302 through 322 preferably are water-only fluid colorants optimized for use with water-borne paints and stains, and the colorants in containers 324 and 326 preferably are water-only fluid colorants optimized for use with water-borne stains. When added by themselves to a solvent-borne paint or stain, the colorants in containers 302 through 326 may exhibit poor compatibility. However, poor compatibility may not be exhibited by all such colorants. For example, the medium yellow colorant in container 320 and the yellow colorant in container 322 may, owing to the nature of these colorants, exhibit reasonable compatibility with both water-borne and solvent-borne paints and stains even in the absence of the synergist in container 328. These latter colorants will nonetheless, in the interest of simplicity, be referred to as "water-only" colorants.

The synergist in container 328 preferably is optimized to provide improved compatibility (for example, a more homogeneous mixture and appearance, and reduced rub-up) when at least colorants 306 through 312, and more preferably when each of colorants 302 through 318 and 324 through 326, is dispensed into a solvent-based paint or stain.

Figure 4:
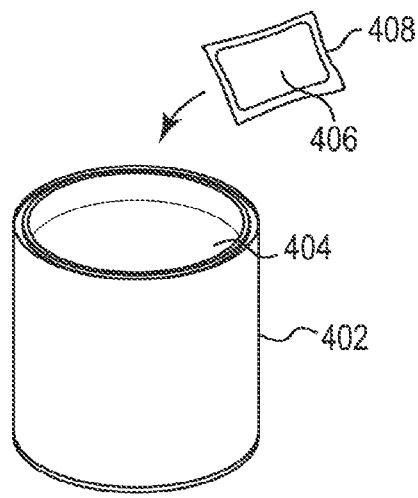
FIG. 4 is a schematic view of the addition to a container of a base paint or stain of a synergist in a sachet.

FIG. 4 is a schematic view of the addition to a container 402 containing a solvent-borne base paint or stain 404 of a synergist 406 in a plastic film sachet 408. Sachet 408 may be made from a variety of solvent-soluble materials such as polyvinylpyrrolidone/vinyl acetate copolymers. If desired, sachet 408 may be made from a material with solvent solubility but little or no water solubility so as to enable retrieval of the intact sachet if it is accidentally dropped into a container of a water-borne paint or stain. Sachet 408 may if desired be sized for use in a smaller (for example, 1 quart) standard container and multiple such sachets may be used when tinting the contents of a larger (for example, 1 gallon) standard container.

Figure 5:
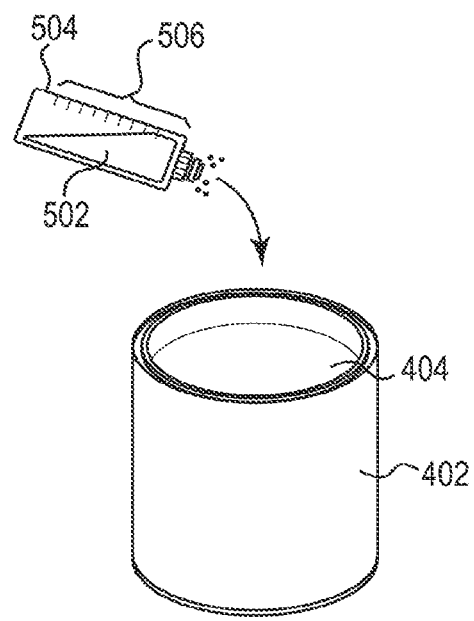
FIG. 5 is a schematic view of the addition to a container of a base paint or stain of a synergist from a squeeze bottle.

FIG. 5 is a schematic view of the addition to container 402 and solvent-borne base paint or stain 404 of a synergist 502 contained in a squeeze bottle 504. Index marks 506 or the contents level in container 402 may be used to gauge the amount of synergist added to container 402.

Figure 6:
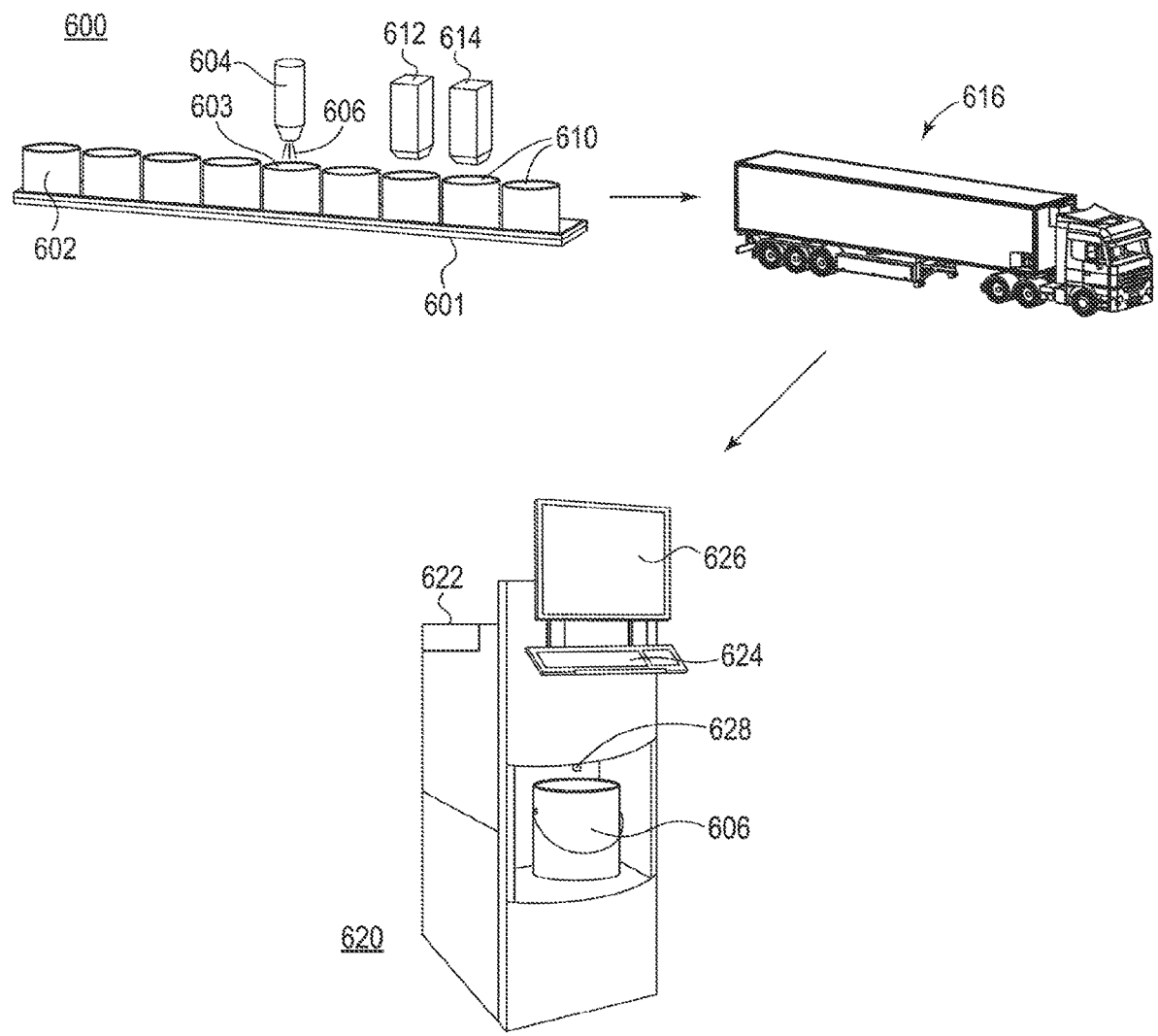
FIG. 6 is a schematic view of the factory addition of a synergist to a base paint or stain, followed by shipment of the synergist-containing base paint or stain to a point-of-sale retail, wholesale or combined retail/wholesale outlet for subsequent tinting.

FIG. 6 is a schematic perspective view of a paint factory filling and packaging line 600 including conveyor 601 for transporting containers 602, which are largely but incompletely filled with solvent-borne base paint or stain 603, past filling station 604 where synergist 606 is added to paint or stain 603. In one embodiment, solvent-borne base paint or stain 603 does not contain any of the ingredients (e.g., surfactants) found in the synergist prior to the addition of synergist at filling station 604. In another embodiment, solvent-borne base paint or stain 603 may, prior to the addition of synergist at filling station 604, already contain one or more of the ingredients found in the synergist, but does not contain sufficient such ingredients to satisfactorily disperse water-only fluid colorants from the array if added in amounts sufficient to fill the available headspace in container 602. Lids 610 are installed at capping station 612 and closed at pressing station 614. The resulting factory-filled, synergist-containing solvent-borne base paint or stain containers are shipped using for example truck 616 to a point-of-sale retail, wholesale or combined retail/wholesale outlet 620. At outlet 620, automated dispensing machine 622 equipped with a keyboard 624 and monitor 626 may be used to dispense water-only fluid colorants through spout 628 into containers 606.

A variety of liquid base paints and stains may be used in the disclosed system and method, and will be familiar to persons having ordinary skill in the art. The base paints and stains normally will contain one or more polymeric binders and one or more pigments, and may in addition contain one or more vehicles or carriers and one or more adjuvants. Exemplary water-borne binders may for example include latex polymers and water-dispersible binders. Such water-dispersible binders may be water-dispersible as is, or may be water-dispersible following the addition of a suitable neutralizing agent such as ammonia or an amine. Exemplary solvent-borne binders may for example include solution polymers. Because appropriate chemical modifications may be used to convert a solution polymer to a water-dispersible polymer, is best to focus on polymer types broadly rather than categorizing any given polymer as being water-borne or solvent-borne. Representative binder polymers accordingly include but are not limited to acrylic copolymers, alkyd resins and other drying oil modified polymers including polyesters and polyurethanes, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, polyesters, polyamides, epoxy esters, polyureas, polyurethanes, polysiloxanes, silicones, fluorinated copolymers such as vinylidene fluoride, and compatible blends of any of the above polymeric binders. The base paints or stains may include a component or components of a multicomponent (e.g., two component) reactive system for the binder such as a component of an isocyanate-polyamine, isocyanate-polyol, epoxy-polyamine, carbodiimide-polyacid, aziridine-polyacid, melamine-polyol, or urea formaldehyde-polyol system. The binder may for example represent about 5 to about 99 volume percent of the dried coating volume. The volume solids, as defined by the fractional volume of dry paint ingredients in the as-supplied wet base paint or stain, may for example represent about 5 to about 80 volume percent of the base paint. The glass transition temperature for the polymeric binder may for example be about −20 to about 60° C. The base paint or stain viscosity may for example be about 40 to about 140 Krebs units.

A variety of pigments may be employed in the base paints and stains, and will be familiar to persons having ordinary skill in the art. The pigments desirably form a stable dispersion that does not require agitation prior to use. In some instances a suitable pigment may also or instead be referred to commercially as a dye. Exemplary pigments include treated or untreated inorganic pigments and mixtures thereof, for example metallic oxides including titanium dioxide, iron oxides of various colors (including black) and zinc oxide; and metallic flakes such as aluminum flakes, pearlescent flakes, and the like. Exemplary pigments also or instead include treated or untreated organic pigments and mixtures thereof, for example carbon black, azo pigments, benzimidazolinones, carbazoles such as carbazole violet, indanthrones, isoindolinones, isoindolons, perylenes, phthalocyanines, quinacridones and thioindigio reds. Suitable pigments are commercially available from a variety of commercial suppliers including BASF, the LANXESS Inorganic Pigment Business Unit of Bayer Corp., Cabot Corp, Ciba Specialty Chemicals, Clariant, Ferro Corporation, Shepherd Color Company, Sun Chemical and Tomatec America, Inc. Other exemplary pigments are described, for example, in U.S. Pat. No. 8,141,599 B2 (Korenkiewicz et al.), 8,746,291 B2 (Hertz et al.), 8,748,550 B2 (Cavallin et al.) and 8,752,594 B2 (Gebhard et al.). The pigments are used in one or both of the base paint or stain and colorants in amounts sufficient to provide a suitably tinted and if need be suitably opaque cured final paint, stain or industrial coating at the desired coating thickness level, e.g., at pigment volume concentrations of about 0 to about 95 volume percent of the base paint or stain.

The pigments may be supplemented with extenders or fillers such as talc, china clay, barytes, carbonates, silicates and mixtures thereof, for example magnesium silicates, calcium carbonate, aluminosilicates, silica and various clays; organic materials including plastic beads (e.g., polystyrene or polyvinyl chloride beads), microspherical materials containing one or more voids, and vesiculated polymer particles (e.g., those discussed in U.S. Pat. Nos. 4,427,835, 4,920,160, 4,594,363, 4,469,825, 4,468,498, 4,880,842, 4,985,064, 5,157,084, 5,041,464, 5,036,109, 5,409,776, and 5,510,422). Other exemplary extenders or fillers include EXPANCEL™ 551DE20 acrylonitrile/vinyl chloride expanded particles (from Expancel Inc.), SIL-CEL™ 43 glass micro cellular fillers (from Silbrico Corporation), FILLITE™ 100 ceramic spherical particles (from Trelleborg Fillite Inc.), SPHERICEL™ hollow glass spheres (from Potter Industries Inc.), 3M ceramic microspheres including grades G-200, G-400, G-600, G-800, W-210, W-410, and W-610 (from 3M), 3M hollow microspheres including 3M Performance Additives iM30K (also from 3M), INHANCE™ UH 1900 polyethylene particles (from Fluoro-Seal Inc.), and BIPHOR aluminum phosphate (from Bunge Fertilizantes S.A., Brazil).

Water-borne base paints or stains include water and optionally may include one or more cosolvents. The water may for example be tap water, deionized water or distilled water. Water-borne base paints or stains may for example contain sufficient water so that at least about 20 or at least about 35 and up to about 80 or up to about 65 wt. % solids are present when the tinted paint or stain is applied to a substrate. Cosolvents may assist in mixing or coating a water-borne base paint or stain; may speed up, retard or otherwise change the time or emissions associated with drying; may improve wet edge properties or overlap characteristics; may improve freeze-thaw protection, or may provide or improve other features, and generally will not be retained in a film of the dried, cured or otherwise hardened paint or stain. A chosen cosolvent may be a hazardous air pollutant solvent (HAPS material) but preferably is a non-HAPS material or is substantially free of HAPS materials. Exemplary cosolvents typically have low molecular weights (e.g., up to about 700, up to about 600, up to about 500 or up to about 400 g/mol) and may for example include glycols (e.g., ethylene glycol, diethylene glycol, triethylene glycol, tetraethylene glycol and propylene glycol), glycol ethers (e.g., DOWANOL™ DPM and Butyl CELLOSOLVE™ from Dow Chemical Co.), alcohols (e.g., methanol, ethanol, n-propanol, isopropanol, n-butanol, isobutanol, 2-methyl butanol, isoamyl alcohol and other primary amyl alcohol isomers, n-pentanol, 2-ethylhexanol, 4-hydroxy-2,6,8-trimethylnonane and diisobutyl carbinol), esters and ester alcohols (e.g., isopropyl acetate; n-butyl acetate; isobutyl acetate; n-propyl acetate; primary amyl acetate mixed isomers, and UCAR™ Ester EEP from Dow Chemical Co.), ketones (e.g., diisobutyl ketone and ECOSOFT™ Solvent IK from Dow Chemical Co.), CARBOWAX™ 300 and CARBOWAX 600 polyethylene from Dow Chemical Co., mixtures thereof and the like. When a cosolvent is present, the coating compositions may for example contain at least about 0.1 or at least about 2 wt. % cosolvent and up to about 10 or up to about 5 wt. % cosolvent based on the tinted paint or stain weight.

The disclosed water-borne base paints and stains preferably are low VOC solutions or dispersions. They may for example contain zero to less than 8 wt. % VOCs, more preferably less than 6 wt. % VOCs, yet more preferably less than 4 wt. % VOCs, and most preferably less than 2 wt. % VOCs based upon the total liquid composition weight.

Solvent-borne base paints or stains may include one or more solvents. The solvent may function as a carrier for the other components of the base paint or stain or may facilitate the blending of colorants or additional ingredients into the base paint or stain. The chosen solvent may depend in part on the chemical makeup of the base paint or stain binder. Exemplary solvents include aliphatic and aromatic solvents, such as mineral spirits, xylene, ketones, glycol ethers, organic esters, alcohols, ethylene or propylene glycols and other aromatic compounds. Mixtures of solvents may be employed, for example, aromatic distillates may be combined with glycol ethers or alcohols. A solvent-borne base paint or stain may for example contain at least about 20 or at least about 30 wt. % solvent, and up to about 50 or up to about 45 wt. % solvent based on the total composition weight.

An optional reactive diluent or resin may be included in the base paint or stain. The reactive diluent or resin may function as a carrier for the other components of the base paint or stain, may facilitate the blending of colorants or additional ingredients into the base paint or stain, may increase the solids content at application without increasing the coating viscosity or VOC content, or may enhance (in some cases, synergistically) various coating performance characteristics such as adhesion, hardness and chemical resistance. Suitable reactive diluents or resins include polymerizable monomers (for example, acrylic or methacrylic monomers), vinyl resins, acrylic resins, epoxy resins, oligomers, polyether polyols, and a variety of low molecular weight polyfunctional resins. If employed, a reactive diluent or resin may for example represent at least about 0.1, at least about 0.5 or at least about 1 wt. %, and up to about 20, up to about 15 or up to about 10 wt. % based on the weight of ingredients in the tinted paint or stain.

Water-borne base paints or stains typically will contain one or more dispersing agents and one or more surfactants. Exemplary dispersing agents include anionic polyelectrolyte dispersants such as maleic acid copolymers, acrylic acid copolymers including methacrylic acid copolymers, and carboxylic acids such as tartaric acid, succinic acid, citric acid, itaconic acid, mixtures thereof and other materials that will be familiar to persons having ordinary skill in the art. Exemplary surfactants include anionic, amphoteric and nonionic materials. There may be some overlap in nomenclature when certain dispersants or surfactants are identified in commercial literature. Suitable dispersants and surfactants are commercially available from a variety of suppliers including 3M, Air Products and Chemicals, Inc., Akzo Nobel, Ashland, BASF, Dow Chemical Co., E. I. DuPont de Nemours and Co., Elementis Specialties, Inc., Harcros Chemicals, Rhodia and Solvay, such as the TAMOL™ series from Dow Chemical Co., nonyl and octyl phenol ethoxylates from Dow Chemical Co. (e.g., TRITON™ X-45, TRITON X-100, TRITON X-114, TRITON X-165, TRITON X-305 and TRITON X-405) and other suppliers (e.g., the T-DET N series from Harcros Chemicals), alkyl phenol ethoxylate (APE) replacements from Dow Chemical Co., Elementis Specialties, Inc. and others, various members of the SURFYNOL™ series from Air Products and Chemicals, Inc. (e.g., SURFYNOL 104, SURFYNOL 104A, SURFYNOL 104BC, SURFYNOL 104DPM, SURFYNOL 104E, SURFYNOL 104H, SURFYNOL 104PA, SURFYNOL 104PG50, SURFYNOL 104S, SURFYNOL 2502, SURFYNOL 420, SURFYNOL 440, SURFYNOL 465, SURFYNOL 485. SURFYNOL 485W, SURFYNOL 82, SURFYNOL CT-211, SURFYNOL CT-221, SURFYNOL OP-340, SURFYNOL PSA204, SURFYNOL PSA216, SURFYNOL PSA336, SURFYNOL SE and SURFYNOL SE-F), various fluorocarbon surfactants from 3M, E. I. DuPont de Nemours and Co. and other suppliers, and phosphate esters from Ashland, Rhodia and other suppliers. When a surfactant or dispersant is present, the base paint or stain may for example contain at least about 0.1, at least about 0.5 or at least about 1 wt. % surfactants or dispersants, and up to about 10, up to about 5 or up to about 3 wt. % surfactants or dispersants based on the total composition weight.

The base paint or stain may contain a variety of other adjuvants that will be familiar to persons having ordinary skill in the art. Representative adjuvants are described in Koleske et al., Paint and Coatings Industry, April, 2003, pages 12-86. Exemplary adjuvants and commercial examples of the same include anti-cratering agents; biocides, fungicides, mildewcides and preservatives (e.g., BUSAN™ 1292 from Buckman Laboratories, Inc., NOPCOCIDE™ N-40D from Cognis, KATHON™ LX from Rohm & Haas, and POLYPHASE™ 663, POLYPHASE 678 and POLYPHASE PW-40 from Troy Corporation); coalescing agents (e.g., those described in U.S. Pat. No. 8,110,624 B2 to Brandenburger et al.); curing indicators; heat stabilizers; leveling agents; light stabilizers (e.g., hindered amine light stabilizers such as TINUVIN™ 123-DW and TINUVIN 292 HP from Ciba Specialty Chemicals); optical brighteners; ultraviolet light absorbers (e.g., TINUVIN 234 and TINUVIN 1130 from Ciba Specialty Chemicals); wetting agents (e.g., BYK™ 346 and BYK 348 from Altana, PENTEX™ 99 from Rhodia and TROYSOL LAC™ from Troy corporation); waxes (e.g., AQUACER™ 593 from Altana, HYDROCER™ 303 from Shamrock Technologies, Inc. and MICHEM™ Emulsion 32535 from Michelman, Inc.); and the like. The types and amounts of these and other adjuvants typically will be empirically selected.

Exemplary commercially-available water-borne base paints and stains that can be used in the disclosed system include ARMSTEAD™, CORAL™, DULUX™ TRADE™ and FLEXA™ emulsion paints from Akzo Nobel; BEHR™, BEHR MARQUEE™ and BEHR PREMIUM™, PREMIUM PLUS™ and PREMIUM PLUS ULTRA™ latex paints from Behr Process Corporation; BENJAMIN MOORE™ BENJAMIN MOORE ADVANCE™, BENJAMIN MOORE AURA™, BENJAMIN MOORE BEN™, BENJAMIN MOORE NATURA™ and BENJAMIN MOORE SELECT™ latex paints from Benjamin Moore & Co.; GLIDDEN™, GLIDDEN PREMIUM™, GLIDDEN HIGH ENDURANCE™, GLIDDEN SPRED™, GLIDDEN DIAMOND™, MANOR HALL™, PORTER™, REGENCY™, WONDER-PURE™ and WONDER-TONES™ latex paints from PPG Industries, Inc.; A-100™, DURATION™, EMERALD™, INFINITY™, OVATION™, RESILIENCE™, SHERWIN-WILLIAMS™, SHOWCASE™ and SUPERPAINT™ latex paints and MINWAX™ Water Based Wood Stains from Sherwin-Williams; and DURAMAX™, MEDALLION, OPTIMUS™, PRISTINE™, RESERVE™, SIGNATURE™, ULTRA™, and VALSPAR™ latex paints from The Valspar Corporation.

Exemplary commercially-available solvent-borne base paints and stains that can be used in the disclosed system include GREAT FINISHES™ stains from Ace Hardware Corporation; DULUX™ and (outside the US) GIDDEN™ alkyd paints from Akzo Nobel; BEHR™ alkyd paints from Behr Process Corporation; oil-based stains from McCormick Paints; MOORE SATIN IMPERVO™ alkyd paint from Benjamin Moore & Co.; WEATHER-SHIELD™ alkyd paints from Kelly-Moore Co., alkyd paints from Huaron Paints (China); BAR-OX™, VELOUR™ and (outside the US) GLIDDEN™ alkyd paints from PPG Industries, Inc.; SHERWIN-WILLIAMS PROCLASSIC™ alkyd paints and MINWAX and MINWAX WOOD FINISH™ stains from Sherwin-Williams; VALSPAR ULTRA 4000™ alkyd paint and CABOT™ stains from The Valspar Corporation; and PERMO-PAVE™ alkyd paints from Wattyl Australia Pty. Ltd.

The base paints and stains typically will be packaged in containers suitable for point-of-sale mixing of small batch lots in custom colors and subsequent sale in the same container to the end user of a custom-tinted paint or stain. Exemplary small batch lot base paint or stain container sizes are about one half pint, one pint, one quart, one liter, one gallon, four liter, five gallon or 20 liter containers, corresponding to base paint or stain containers from about 0.2 to 20 L. The base paint or stain container typically will be equipped with a removable lid, cap or other closure for an opening through which colorant may be dispensed into the base paint or stain. Depending on the amount of pigment already present in a base paint or stain, the base paint or stain container typically will have a small headspace (e.g., about 1 to about 15% of the container volume) for colorant addition. For example, a nominal one gallon (3.79 L) clear base paint or stain container may hold up to about 112 fluid ounces (3.31 L) or up to about 116 fluid ounces (3.43 L) of the base paint or stain, respectively leaving at least about 16 fluid ounces (0.47 L or about 13% of the total container volume) or at least about 12 fluid ounces (0.35 L or about 9% of the total container volume) available for colorant addition. A nominal one gallon (3.79 L) white base paint or stain container may for example hold about 128 fluid ounces (3.79 L) of the base paint or stain, with only a small headspace (e.g., about 0.04 L or about 1% of the total container volume) available for colorant addition. When additional base paints or stains of intermediate lightness are employed, they likewise may have intermediate available headspace volumes for colorant addition. For example, a three base system may employ the white and clear base paints or stains mentioned above, together with a gray base whose container has up to about 120 fluid ounces (3.55 L) or up to about 124 fluid ounces (3.57 L) of base paint or stain with at least about 8 fluid ounces (0.24 L) or at least about 4 fluid ounces (0.12 L) of headspace available for colorant addition. Additional high chroma base paints or stains (e.g., deep red, deep blue or deep yellow base paints or stains) may be employed if desired for making strongly-tinted custom paint shades with potential one coat hiding power.

A variety of colorants may be used in the disclosed system and method, and will be familiar to persons having ordinary skill in the art. The colorants normally will contain one or more pigments, one or more vehicles or carriers and one or more pigment dispersing agents or surfactants, and will be in the form of pourable liquids. The colorants typically will not contain film-forming binders, and should be combined with a base paint or stain in order to provide a durable dried or cured finish. Suitable pigments include those discussed above. Colorants or colorant arrays containing entirely inorganic pigments or pigment mixtures may be preferred where custom-tinted paints or stains having maximum exterior durability are desired. Suitable vehicles or carriers include water and the cosolvents discussed above. Suitable pigment dispersing agents and surfactants include those discussed above. The colorant may for example contain at least about 30, at least about 40 or at least about 50 wt. % pigment and up to about 90, up to about 80 or up to about 70 wt. % pigment. The colorant may for example contain at least about 10, at least about 20 or at least about 30 wt. % vehicles or carriers, and up to about 70, up to about 60 or up to about 50 wt. % vehicles or carriers. The colorant may for example contain at least about 0.1, at least about 0.5 or at least about 1 wt. % surfactants or dispersants, and up to about 20, up to about 15 or up to about 10 wt. % surfactants or dispersants based on the total colorant weight. The colorants may also contain one or more adjuvants. Suitable adjuvants include those discussed above. The colorants preferably are non-settling and low VOC.

Exemplary water-only fluid colorants that may be used in the disclosed system are produced by a number of manufacturers including Akzo Nobel, BASF, Clariant, Color Corporation of America (a subsidiary of the present assignee), CPS Color, Inc., Evonik Industries, ICI, PPG and Sherwin-Williams, such as the NOVOCOLOR™ HPII 8600 and NOVOCOLOR HP 8900 colorant lines from Color Corporation of America, the GENNEX™ colorant line from Benjamin Moore and the ECOTONER™ colorant line from Sherwin-Williams. The chosen colorants may include all or a portion of a particular product array. For example, an array of water-only colorants including at least white, green, blue and red colorants may be selected from the above-mentioned NovoColor HP 8900 product line by selecting no. 8900 White, either or both of no. 8920 or 8921 Phthalo Green, either or both of no. 8930 or 8932 Phthalo Blue, and either or both of no. 8942 Interior Red or 8951 Exterior Red. Additional colorants may, subject to the availability of suitable dispenser slots, be added to the array as desired. Exemplary such additional colorants include one or more yellow, orange, magenta, brown or black colorants from the colorant manufacturers mentioned above.

The disclosed system and method may for example employ 5, 6, 7, 8, 9, 10, 11, 12, 13, 14 or 15 colorants, but may employ as few as four colorants if a restricted (viz., relatively few hues and relatively low gamut) color space is acceptable. The disclosed system may employ more than 15 colorants if sufficient dispenser slots are available and additional colorant SKUs are acceptable. For example, the disclosed system and method may employ 16, 17, 18, 19, 20, 21, 22, 23 or 24 colorants.

When the available number of colorant dispenser canisters is limited (e.g., when using a 12 or fewer canister dispenser), the number of colorant SKUs may be reduced by recognizing that some individual colorants are themselves mixtures of pigments which may be replaced with a precisely-metered blend of individual colorants. For example, many custom color paint systems employ one or more earth-tone colorants variously referred to using names such as brown oxide, raw umber or umber. Although brown oxide colorant is sometimes referred to as being made from a single pigment (e.g., PBr7 natural iron oxide), it may actually have been made using a blend of red and yellow oxides (e.g., PR101 red iron oxide and PY42 yellow iron oxide) shaded with carbon black (e.g., PBk7 carbon black) to match a specific color target. Raw umber or umber earth-tone colorants (which may collectively be referred to as "raw umber" colorants) likewise may have been made from a blend of colored oxides and carbon black. These blends may be replaced by adding colorants wholly made from (or substantially wholly made from) appropriate individual pigments, so as to provide a paint or stain whose coloration is like the coloration that would be obtained using a traditional blended pigment colorant. This may be done by using an automated colorant dispenser having a suitably low minimum fluid dispensing quantity (e.g., a minimum fluid dispensing quantity less than 0.01 fluid ounce (<0.3 mL)) so as to enable dispensing of small quantities of the individual colorants. Further details regarding the manner in which such blends may be dispensed may be found in the above-mentioned U.S. Pat. No. 8,141,599 B2. For example, a blend made using precisely-metered small amounts of yellow oxide pigment, red oxide pigment and black pigment may be dispensed into the base paint or stain whenever a tinted paint or stain with a brown oxide or raw umber tint is required.

The disclosed colorants desirably have PVC values of at least about 0.1 vol. %, at least about 0.5 vol. % or at least about 1 vol. %, and up to about 25 vol. %. The amount of colorant(s) dispensed into a 1 gallon (3.78 L) nominal container of base paint or stain will vary in part depending on the base paint, stain or colorant PVC values and may for example range from about 0.00065 fluid ounces (0.19 mL) to about 16 fluid ounces (473 mL) of colorant addition, with larger amounts typically being employed in a clear base paint or stain or in a larger base paint or stain container, and smaller amounts typically being employed in a white base paint or stain or in a smaller base paint or stain container. The finished tinted paints or stains may for example have PVC values of at least about 0.5 or at least about 1 vol. %, and may for example have PVC values of up to about 85 vol. % or up to about 50 vol. %.

The colorant array may if desired include one or more solvent-borne colorants. Preferably however, all of the colorants in the array and in the colorant dispenser are waterborne colorants. In one preferred embodiment, the majority or even all of the colorants in the array and in the colorant dispenser are water-only fluid colorants. In other preferred embodiments, less than two, less than one or none of the colorants in the array and in the colorant dispenser are compatible with alkyd paints and stains, and the remaining colorants in the array will exhibit visually objectionable rub-up or insufficient tint strength if dispensed into such alkyd paints and stains without the synergist in representative tinting amounts of about 1 to about 15% of the alkyd paint or stain container volume.

The colorants (and optionally the synergist) typically will be packaged in containers suitable for use in the chosen colorant dispenser(s), and sold to the dispenser owner or operator in a point-of-sale custom tinting facility rather than to the end user of a custom-tinted paint or stain. Exemplary small batch lot colorant container sizes are about 0.5, 1, 2 or 3 quarts; about 1 gallon; or about 0.5, 1, 2, 3, 4 or 5 liters, corresponding to colorant containers from about 0.5 to about 5 L. Exemplary colorant containers include boxes, cans, cartridges, jars, pouches (e.g., sealed pouches made of metal or plastic), squeeze bottles, syringes, tubes (e.g., collapsible tubes such as toothpaste-style tubes made of metal or plastic, and more rigid tubes equipped with movable pistons or plungers such as caulking-style tubes made of metal, plastic or paper) and other containers in which the colorant can be sealed for storage and shipment and, when needed to replace an empty container, placed in an appropriate slot or other receptacle or poured into an appropriate hopper or other vessel in the colorant dispenser so that colorant may be dispensed by the colorant dispenser in controlled amounts. The colorants may be supplied to the dispenser owner or operator in a can or other sealed container designed to be opened using a can opener or other can-puncturing device. The containers may be equipped with a manually-openable closure such as an openable and recloseable cap, or may be equipped with an irreversibly openable closure such as a tear-off seal or rupturable septum. In any event, once the container has been opened, colorant may be supplied to the colorant dispenser and thence into the base paint or stain container. Desirably the container, colorant dispenser or both have a nozzle, adapter orifice or other design which facilitates clean entry of the colorant into the colorant dispenser with minimal spillage or waste before or after use. As supplied to the dispenser owner or operator, the colorant container typically will include little or no headspace.

A variety of surfactants, optional dispersing agents and optional cosolvents may be used in the disclosed synergist. Exemplary such materials include surfactants, dispersing agents and cosolvents that have been used or recommended for use in universal paint colorants, such as those described in U.S. Pat. No. 2,878,135 (Willis), U.S. Pat. No. 6,287,377 B1 (Binns et al.), U.S. Pat. No. 7,659,340 B2 (Coward et al.), U.S. Pat. No. 9,080,030 B2 (Amiel et al.), U.S. Patent Application Publication No. US 2016/0333213 A1 (Zhou et al.) and Published International Application No. WO2016040641 A1 (Donlon et al.). The synergist materials preferably are (but in view of their intended use in solvent-borne base paints and stains are not required to be) low VOC materials. In certain preferred embodiments the synergist will be a combination of two or more surfactants, with the surfactants being selected to provide improved colorant compatibility across a range of solvent-borne base paint or stain binders, or within an array of water-only fluid colorants. In additional embodiments the synergist may also include one or more dispersing agents, one or more cosolvents, or one or more dispersing agents and one or more cosolvents. The surfactants and optional dispersing agents may be solids or liquids. As will be appreciated by persons having ordinary skill in the art, the optional cosolvents will be liquids, and preferably low VOC liquids. When solid surfactants or solid optional dispersing agents are employed, they may if desired be combined with a liquid surfactant, dispersing agent, cosolvent or conventional carrier or solvent (preferably a low VOC carrier or solvent) to provide a liquid synergist.

Suitable synergists may be selected in a variety of ways, including empirical testing to identify surfactants, dispersing agents or cosolvents that render the individual members of the desired water-only colorant array compatible with the desired base paints and stains; by selecting surfactants, dispersing agents or cosolvents that have previously been used in universal colorants; or by choosing surfactants, dispersing agents or cosolvents based upon structural considerations such as hydrophilicity, oliophilicity and the ability of the synergist to pull a water-only colorant into a solvent phase.

Suitable surfactants for use in the synergist include nonionic, anionic, cationic or amphoteric surfactants. Nonionic surfactants are presently preferred. Anionic, cationic or amphoteric surfactants may be used with some water-only fluid colorants, especially if used in combination with one or more other synergists.

Exemplary cosolvents for use in the disclosed synergist include the cosolvents discussed above. Glycols (e.g., ethylene glycol and diethylene glycol), glycol ethers (e.g., DOWANOL™ DPM and Butyl CELLOSOLVE™ from Dow Chemical Co.), alcohols (e.g., n-propanol, isopropanol, n-butanol, isobutanol, 2-methyl butanol, isoamyl alcohol and other primary amyl alcohol isomers, n-pentanol, 2-ethylhexanol, 4-hydroxy-2,6,8-trimethylnonane and diisobutyl carbinol), esters and ester alcohols (e.g., isopropyl acetate; n-butyl acetate; isobutyl acetate; n-propyl acetate; primary amyl acetate mixed isomers, and UCAR™ Ester EEP from Dow Chemical Co.) represent preferred cosolvents, and ethylene glycol and diethylene glycol represent especially preferred cosolvents. The cosolvents preferably are (but in view of their intended use in solvent-borne base paints and stains are not required to be) low VOC materials.

Exemplary dispersing agents for use in the disclosed synergist include monomeric, oligomeric or polymeric materials that may assist in dispersing the colorant pigments into solvent-borne base paints and stains. The dispersing agents preferably are (but in view of their intended use in solvent-borne base paints and stains are not required to be) low VOC materials. There may be some overlap in materials that may be designated as dispersing agents for use in or as the disclosed synergist and materials that may have been designated in other contexts for use as cosolvents. With that in mind, exemplary dispersing agents that may be used in or as the synergist include materials such as dioctyl maleate, tributyl citrate, dihydric or polyhydric alcohols, polyethers including polyalkyl glycols and polyhydroxyethers, alcohols including ester alcohols such as TEXANOL™ ester alcohol from Eastman Chemical Company, polyethers including polyalkyl glycols and polyhydroxyethers, modified polyureas, polyalkylene oxides, combinations thereof, and compounds having Formula I shown below:

$$R_1O(C(O))_mA(R_3)(R_4)(C(O))_nR_2 \qquad I$$

wherein:

A is a divalent $C_1$-$C_{10}$ alkyl, $C_2$-$C_{10}$ alkenyl or $C_3$-$C_{10}$ cycloalkyl radical;

$R_3$ and $R_4$ are independently H, substituted or unsubstituted $C_1$-$C_6$ alkyl, substituted or unsubstituted $C_3$-$C_6$ cycloalkyl, —$OR_5$ or $C(O)OR_5$ radicals, wherein $R_5$ is H or a substituted or unsubstituted $C_1$-$C_6$ alkyl, substituted or unsubstituted $C_3$-$C_6$ cycloalkyl, or $C_1$-$C_6$ alkoxy radical;

$R_1$ and $R_2$ are independently H, —C=O, or a substituted or unsubstituted $C_1$-$C_6$ alkyl radical;

m is 0 or 1; and n is 0 or 1.

Exemplary dispersing agents include the compounds II and III shown below:

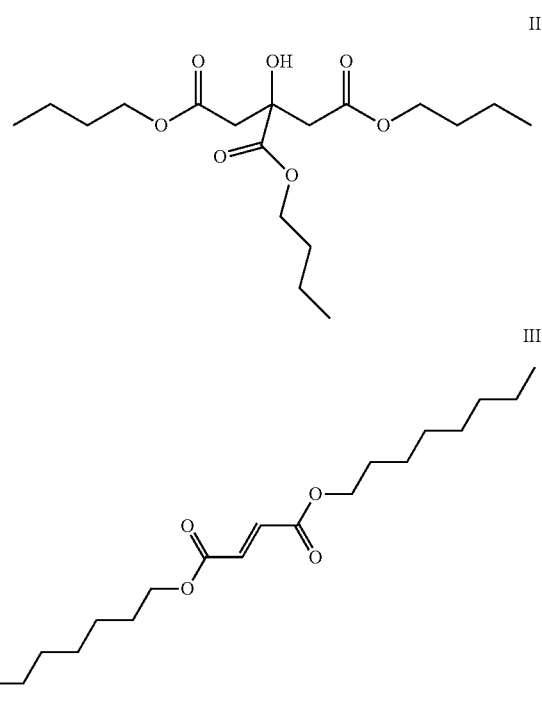

Set out below in Table I are a variety of exemplary surfactants for use in the disclosed synergist formulations, along with an identification of their physical form at room temperature and an indication of their compatibility with alkyd or latex paints. Those shown as being compatible with both alkyd and latex paints may in many instances be used as is. Those that are shown as being compatible only with alkyd paints but not with latex paints may also in many instances be used as is. Those however that are shown as being compatible only with latex paints but not with alkyd paints should be used together with one or more alkyd-compatible surfactants, which normally would be located in the synergist rather than in the colorants. In preferred embodiments, the synergist formulations comprise, consist of or consist essentially of at least one liquid surfactant from Table I, or a combination of liquid and solid surfactants from Table I that when mixed will provide a liquid dispensable from a canister in a tinting machine. Additional preferred embodiments are also solvent-free and thereby provide low to zero VOC formulations:

TABLE I

| Item | Description | Physical Form | Alkyd Compat. | Latex Compat. |
|---|---|---|---|---|
| YELKIN ™ TS Soya Lecithin Unbleached (from Archer Daniels Midland Co.) | lecithin | liquid | x | |
| HYDROPALAT ™ WE 3135 (from BASF) | difunctional block copolymer terminating in primary hydroxyl groups | liquid | | x |
| HYDROPALAT WE 3167 (from BASF) | difunctional block copolymer terminating in primary hydroxyl groups | liquid | | x |
| HYDROPALAT WE 3317 (from BASF) | difunctional block copolymer terminating in primary hydroxyl groups | liquid | | x |
| TETRONIC ™ 904 (from BASF) | tetrafunctional block copolymer terminating in primary hydroxyl groups | paste | | x |
| BYK ™ 2015 (from Byk Altana) | solution of a structured acrylate copolymer with pigment affinic groups | liquid | | x |
| DISPERBYK ™ 102 (from Byk Altana) | copolymer with acidic groups | liquid | x | x |
| DISPERBYK 190 (from Byk Altana) | solution of a high molecular weight block copolymer with pigment affinic groups | liquid solution | | x |
| DISPERBYK 2091 (from Byk Altana) | modified poly-alkoxylate with neutral pigment affinic groups | liquid | x | x |
| DISPERBYK 2095 (from Byk Altana) | salt polyamine amides and polyesters | liquid | x | x |
| CENTROLEX F ™ powder (from Central Soya Company Inc.) | oil-free dry lecithin | Solid | x | |
| HOSTAPHAT ™ 1306 (from Clariant) | phosphate ester | liquid | x | x |
| SMA 1440H (from Cray Valley) | styrene maleic anhydride co-polymer solution | liquid solution | x | x |
| AEROSOL ™ OT-100 (from Cytec Industries) | sodium dioctyl sulfosuccinate | solid | x | x |
| TAMOL ™ 165A Dispersant (from Dow Chemical Company) | hydrophobic copolymer polyelectrolyte | liquid | | x |
| TAMOL 731A 25% (from Dow Chemical Company) | Na salt of a maleic anhydride copolymer | liquid solution | | x |
| TERGITOL ™ 15-S-9 Surfactant (from Dow Chemical Company) | secondary alcohol ethoxylate | liquid | x | x |
| SOLEC ™ F Deoiled Soy Lecithin Powder (from DuPont Danisco) | dry lecithin | solid | x | |
| TEGO ™ Dispersant 750 W (from Evonik Resource Efficiency GmbH) | solution of a copolymer with pigment affinic groups | liquid solution | | x |
| SOLSPERSE ™ 67000 (from Lubrizol Corp) | 100% NVM polymeric compatibiliser | liquid | x | x |
| ABEX ™ 2545 (from Rhodia Solvay Group) | proprietary nonionic surfactant | liquid | | x |
| GEROPON ™ 99 (from Rhodia Solvay Group) | sodium dioctyl sulfosuccinate (Solvay) | liquid | x | x |
| GEROPON AS-200 flake (from Rhodia Solvay Group) | sodium cocoyl isethionate | solid | x | x |
| GEROPON SDS (from Rhodia Solvay Group) | sodium dioctyl sulfosuccinate | solid | x | x |
| GEROPON T-22A (from Rhodia Solvay Group) | sodium methyl oleyl taurate | liquid | x | x |
| GEROPON T-77 (from Rhodia Solvay Group) | sodium oleyl N-methyl taurate | solid | x | x |
| LUBRHOPHOS ™ LK 500 (from Rhodia Solvay Group) | linear alcohol ethoxy phosphate | liquid | x | x |
| NOVEL ™ 23E7 Ethoxylate (from Rhodia Solvay Group) | alcohol ethoxylate | liquid | x | x |
| NOVEL 23E9 Ethoxylate (from Rhodia Solvay Group) | alcohol ethoxylate | liquid | x | x |
| PENTEX ™ 99 (from Rhodia Solvay Group) | sodium dioctyl sulfosuccinate | liquid | x | x |
| RHODACAL ™ 330 (from Rhodia Solvay Group) | branched isopropylamine dodecylbenzene sulfonate | liquid | x | x |
| RHODACAL BX-78 (from Rhodia Solvay Group) | sodium dibutyl naphthalene sulfonate | solid | x | x |
| RHODACAL DS-10 (from Rhodia Solvay Group) | branched sodium dodecylbenzene sulfonate | solid | x | x |
| RHODACAL IPAM (from Rhodia Solvay Group) | linear isopropylamine dodecylbenzene sulfonate | liquid | x | |
| RHODACAL N (from Rhodia Solvay Group) | sulfonated naphthalene condensate, sodium salt | solid | x | x |
| RHODACAL SSA/A (from Rhodia Solvay Group) | linear sodium dodecylbenzene sulfonate | liquid | x | x |
| RHODAFAC ™ PL-6 (from Rhodia Solvay Group) | linear alcohol ethoxy phosphate | liquid | x | x |
| RHODAFAC PL-620 (from Rhodia Solvay Group) | linear alcohol ethoxy phosphate | liquid | x | x |
| RHODAFAC RA-600 (from Rhodia Solvay Group) | linear alcohol ethoxy phosphate | liquid | x | x |
| RHODAFAC RS-410 (from Rhodia Solvay Group) | branched alcohol ethoxy phosphate | liquid | x | x |
| RHODAFAC RS-610 (from Rhodia Solvay Group) | branched alcohol ethoxy phosphate | liquid | x | x |
| RHODAFAC RS-710 (from Rhodia Solvay Group) | branched alcohol ethyoxy phosphate ester | liquid | x | |
| RHODAFAC RS-960 (from Rhodia Solvay Group) | branched alcohol ethoxy phosphate | liquid | x | x |
| RHODASURF ™ BC-630 (from Rhodia Solvay Group) | dodecylphenol ethoxylate | liquid | x | x |
| RHODASURF BC-720 (from Rhodia Solvay Group) | tridecyl alcohol ethoxylate | liquid | x | x |
| RHODOLINE ™ 3600 (from Rhodia Solvay Group) | 100% NVM proprietary compatibiliser | liquid | x | x |
| RHODOLINE | proprietary | liquid | x | x |

TABLE I-continued

| Item | Description | Physical Form | Alkyd Compat. | Latex Compat. |
|---|---|---|---|---|
| DP5817 (from Rhodia Solvay Group) | compatibiliser | | | |
| SOPROPHOR ™ 3D/33 (from Rhodia Solvay Group) | tristyrylphenol ethoxy phosphate | liquid | x | x |
| SOPROPHOR TS-10 (from Rhodia Solvay Group) | ethoxylated tristyrylphenol | liquid | x | x |
| G-3300 Alkyl Aryl Sulfonate (from Stepan Company) | alkyl aryl sulfonate, isopropyl amine salt | liquid | x | |

The disclosed synergist may if desired include one or more adjuvants, such as one or more rheology modifiers or thickeners. Other optional adjuvants include but are not limited to adhesion promoters, antioxidants, biocides, buffers, coalescing agents, defoamers, dispersants, dyes, extender fillers, humectants, leveling agents, neutralizers, optical brighteners, pearlescents, plasticizers, polymeric additives, preservatives, reactive diluents, tackifiers, ultraviolet stabilizers (e.g., hindered amine light stabilizers) and waxes. The synergist may in some embodiments include water, in amounts for example of at least about 110 wt. %, at least about 125 wt. %, or at least about 150 wt. % of the weight of nonaqueous ingredients in the synergist, and in amounts up to about 500 wt. %, up to about 400 wt. % or up to about 300 wt. % of the weight of nonaqueous ingredients in the synergist. In certain embodiments, the disclosed synergist consists essentially of or consists of surfactants, optional dispersing agents, optional cosolvents and optional rheology modifiers or thickeners. For example, the synergist may contain less than 5 wt. % or less than 1 wt. % of any other ingredients.

The synergist may be packaged and shipped in a variety of containers, including those discussed above in connection with the base paint or stain, and those discussed above in connection with the colorant. In some embodiments, the synergist container is like that used for the colorants, and can be installed in and dispensed from an available slot in the colorant dispenser. In other embodiments, the synergist is packaged and shipped in a container from which the synergist can be manually dispensed, such as a sachet as shown in FIG. 4, a squeeze bottle as shown in FIG. 5, or in any of a number of other convenient packaging containers that will be familiar to persons having ordinary skill in the art.

Sufficient synergist should be employed to provide the desired degree of colorant dispersion into the solvent-borne base paint or stain to be tinted, while leaving sufficient remaining headspace in the base paint or stain container to permit addition of the desired colorant amount. Expressed on a volumetric basis, exemplary synergist amounts may for example be at least about 2, at least about 4, at least about 6, at least about 8 or at least about 10 mL of synergist per liter of solvent-borne base paint or stain to be tinted, and up to about 60, up to about 50, up to about 40, up to about 30 or up to about 20 mL of synergist per liter of solvent-borne base paint or stain to be tinted. If made containing a combination of ingredients, the synergist preferably provides a stable, homogeneous, non-settling composition that can be mixed into the base paint or stain in such exemplary amounts using a conventional paint stirrer or shaker and without forming visible clumps after mixing.

A variety of manual or automated colorant dispensers may be used in the disclosed system and method, including the COROB™ D50 manual colorant dispenser with a $1/48$ fluid ounce (0.62 mL) minimum dispensing capacity from CPS Color Equipment, Inc., the ACCUTINTER™ 1500, 2000, 7000 and 8000 series automated colorant dispensers with a $1/384$ fluid ounce (0.077 mL) minimum dispensing quantity from Fluid Management, Inc., and the Sample Dispensing System automated colorant dispenser with a $1/1024$ fluid ounce (0.029 mL) minimum dispensing quantity from Fluid Management, Inc. Additional automated paint or stain colorant dispensers include the COROB MODULA HF™ machine with a $1/192$ fluid ounce (0.153 mL) minimum dispensing quantity from CPS Color Equipment, Inc., and the TATOCOLOR™ machine with a $1/384$ fluid ounce (0.077 mL) minimum dispensing quantity from CPS Color Equipment, Inc. The chosen dispenser may for example have a minimum fluid dispensing quantity less than 0.01 fluid ounce (<0.3 mL), preferably less than 0.007 fluid ounce (<0.2 mL) and more preferably less than 0.005 fluid ounce (<0.15 mL). Dispensers with even smaller minimum dispensing quantities may be employed, e.g. less than 0.001 fluid ounce (<0.03 mL) or less than 0.0002 (<0.014 mL) minimum dispensing quantities, but such dispensers may also require longer amounts of time to prepare strong colors in large containers.

The disclosed custom-colored architectural paints and stains may be applied to a variety of substrates, e.g., asphalt (including asphalt composition shingles and membranes), cement, cement fiberboard and roofing tiles, ceramics, concrete, fabric, glass, metal, paper, plastic and wood (including monolithic, engineered and veneered wood), and other substrates that will be apparent to persons having ordinary skill in the art.

The invention is further described in the following Examples, in which all parts and percentages are by weight unless otherwise indicated.

EXAMPLES

Example 1

NOVOCOLOR HPII 8600 water-only fluid colorants from The Valspar Corporation were tested without and with a synergist in an alkyd base paint (Ace Royal polyurethane alkyd enamel No. 245A320 from Ace Hardware Corporation) and an oil-based stain (Cabot Semi-Transparent deck and siding stain No. 0306 from The Valspar Corporation). The synergist contained the ingredients shown below in Table II:

TABLE II

| Ingredient | Wt. % |
|---|---|
| Rhodacal VS1 Surfactant | 44.50 |
| Rhodafac RS-710 Surfactant | 33.33 |
| Dioctyl Maleate Cosolvent | 22.17 |

For the tinted alkyd paint, tint strength and rub-up were used to show that adding the synergist during colorant mixing provided the necessary compatibility. For the tinted oil-based stain, a pass/fail compatibility test and rub-up were evaluated to show the effectiveness of the synergist. The rub-up test was performed as follows:

Rub-Up Test

The base paint or stain to be tested is placed in a tared glass jar equipped with a lidded closure, closed and weighed. The inside of the lid is coated by turning the jar over and back. The jar is opened and desired amounts of the colorant and optional synergist are added based on the weight per gallon of the tinted base (viz., the base after being combined with the colorant and optional synergist). The jar is closed and shaken on a HARBIL™ paint shaker for 1 or 3 minutes. The jar is again opened and a plastic pipette whose tip has been cut down by 13 mm (½ inch) is used to remove a sample of tinted material. The pipette is set aside for later drawdown preparation. The jar is again closed and shaken on the paint shaker for an additional 3 minutes, followed by removal of a pipetted sample, and then shaken for another 3 minutes, to provide samples shaken for a total of 1 or 3 minutes, and for a total of 6 or 9 minutes. A portion of the 1 or 3 minute shaken sample is squeezed from the pipette onto the left side of a drawdown card, and a spatula is used to apply a portion of the 6 or 9 minute shaken sample onto the right side of the drawdown card. Using a 4 mil BIRD™ film applicator for pastel, tint and midtone bases, and a 6 mil BIRD film applicator for ultradeep or clear bases, drawdown coating films are prepared and allowed to sit until the coating begins to dry around the edges, normally about 3-5 minutes for latex coatings and most alkyd coatings.

An index finger and mild pressure are employed to make even circular "rub-up" patterns on the upper outside edge of each coated film, applying shear to the coated areas without rubbing through the film, and normally using at least 5 and up to 25 rubs on each coated film. The films are allowed to air dry for 10 minutes and then forced dried in a 49° C. (120° F.) oven for at least 20 minutes. The dried films are compared visually and using a colorimeter to evaluate the extent of rub-up. The visual evaluation can be reported on a pass or fail basis based on the sample shaking time, and the rub-up characteristics can be reported as none, slight light, moderate light, severe light, slight dark, moderate dark, or severe dark rub. The colorimeter evaluation can be reported as the strength difference ΔE based on measurements of ΔCRG, ΔCYB and ΔL.

The results for Example 1 are shown below in Table III and Table IV:

TABLE III

Tinting alkyd base paint using a water-only colorant without and with synergist

| Colorant | Color | 4 oz. (118 mL) water-only colorant per gallon (3.8 L) of tinted base No synergist | | 4 oz. (118 mL) water-only colorant per gallon (3.8 L) of tinted base 2 oz. (59 mL) synergist | |
|---|---|---|---|---|---|
| | | Tint strength | Rub-up | Tint strength | Rub-up |
| 8600 | white | 100.28 | Severe dark | 103.03 | Trace dark |
| 8613 | yellow | 101.50 | Severe dark | 100.62 | None |
| 8614 | medium yellow | 98.23 | Severe dark | 100.21 | Trace dark |
| 8621 | green | 103.61 | Severe dark | 101.56 | Trace dark |
| 8632 | blue | 100.57 | Severe dark | 100.70 | Mod dark |
| 8635 | red oxide | 100.63 | Trace dark | 100.82 | None |
| 8647 | red | 99.31 | Mod dark | 100.44 | None |
| 8649 | magenta | 100.06 | Severe dark | 100.77 | Slight dark |
| 8651 | red | 102.83 | Severe dark | 102.88 | Slight dark |
| 8678 | yellow oxide | 101.05 | None | 101.50 | None |
| 8688 | raw umber | 86.66 | Severe dark | 101.60 | None |
| 8691 | black | 100.93 | Slight dark | 100.56 | None |
| 8697 | brown oxide | 100.97 | Mod dark | 100.57 | None |

TABLE IV

Tinting oil-based stain using a water-only colorant without and with synergist

| Colorant | Color | 12 oz. (355 mL) water-only colorant per gallon (3.8 L) of tinted base No synergist | | 12 oz. (355 mL) water-only colorant per gallon (3.8 L) of tinted base 2 oz. synergist | |
|---|---|---|---|---|---|
| | | Compatibility | Rub-up | Compatibility | Rub-up |
| 8600 | white | Fail 3 | Mod light | Pass 6 | None |
| 8613 | medium yellow | Pass 6 | Trace dark | Pass 6 | Trace dark |
| 8614 | yellow | Pass 6 | Trace dark | Pass 9 | None |
| 8621 | green | Fail 3 | Severe Dark | Pass 6 | Slight dark |
| 8632 | blue | Fail 1 | Severe Dark | Pass 6 | Mod dark |
| 8635 | red oxide | Fail 1 | Severe Dark | Pass 6 | Slight dark |
| 8647 | red | Fail 3 | Mod dark | Pass 6 | Slight dark |
| 8649 | magenta | Fail 3 | Severe Dark | Pass 6 | Mod dark |
| 8651 | red | Fail 3 | Severe Dark | Pass 6 | Mod dark |
| 8678 | yellow oxide | Fail 3 | Mod dark | Pass 6 | Slight dark |
| 8688 | raw umber | Fail 3 | Severe Dark | Fail 3 | Mod dark |
| 8691 | black | Fail 3 | Mod dark | Pass 9 | None |
| 8697 | brown oxide | Fail 3 | Severe Dark | Pass 6 | Mod dark |

The results in Table III and Table IV show that when the synergist was not employed, No. 8613 Yellow did not exhibit objectionable incompatibility when dispensed into the oil-based stain, but in all other instances the colorants exhibited objectionable incompatibility when dispensed into either the alkyd base paint or the oil-based stain. Addition of the synergist significantly improved the compatibility and lessened the susceptibility to rub up for each of the latter combinations.

Example 2

Using the method of Example 1, NOVOCOLOR HP 8900 water-only fluid colorants from The Valspar Corporation were tested without and with a synergist in No. 245A320 Ace Royal polyurethane alkyd enamel and in No. 0306 Cabot Semi-Transparent deck and siding stain. The results are shown below in Table V and Table VI:

TABLE V

Tinting alkyd base paint using a water-only colorant without and with synergist

| Colorant | Color | 4 oz. (118 mL) water-only colorant per gallon (3.8 L) of tinted base No synergist | | 4 oz. (118 mL) water-only colorant per gallon (3.8 L) of tinted base 2 oz. (59 mL) synergist | |
|---|---|---|---|---|---|
| | | Tint strength | Rub-up | Tint strength | Rub-up |
| 8900 | White | 107.39 | Mod dark | 105.94 | Slight dark |
| 8913 | Organic Yellow | 102.34 | Slight dark | 102.61 | None |
| 8915 | Medium Yellow | 105.51 | Slight dark | 101.39 | None |
| 8916 | Durable Yellow | 101.68 | Slight dark | 101.22 | None |
| 8920 | Phthalo Green | 110.25 | Mod dark | 105.94 | Mod dark |
| 8930 | Phthalo Blue | 106.49 | Severe dark | 102.31 | Slight dark |

TABLE V-continued

Tinting alkyd base paint using a water-only colorant without and with synergist

| | | 4 oz. (118 mL) water-only colorant per gallon (3.8 L) of tinted base No synergist | | 4 oz. (118 mL) water-only colorant per gallon (3.8 L) of tinted base 2 oz. (59 mL) synergist | |
|---|---|---|---|---|---|
| Colorant | Color | Tint strength | Rub-up | Tint strength | Rub-up |
| 8935 | Red Iron Oxide | 98.61 | Slight dark | 101.77 | None |
| 8942 | Interior Red | 104.55 | Mod dark | 105.33 | Slight dark |
| 8951 | Exterior Red | 106.26 | Mod dark | 106.77 | Slight dark |
| 8964 | Orange | 100.06 | Mod dark | 102.37 | Slight dark |
| 8978 | Yellow Iron Oxide | 95.03 | Slight dark | 101.97 | None |
| 8983 | Magenta | 100.32 | Severe dark | 106.21 | Mod dark |
| 8988 | Raw Umber | 89.09 | Mod dark | 104.02 | Slight dark |
| 8991 | Lamp Black | 109.30 | Mod dark | 101.83 | None |

TABLE VI

Tinting oil-based stain using a water-only colorant without and with synergist

| | | 12 oz. (355 mL) water-only colorant per gallon (3.8 L) of tinted base No synergist | | 12 oz. (355 mL) water-only colorant per gallon (3.8 L) of tinted base 2 oz. synergist | |
|---|---|---|---|---|---|
| Colorant | Color | Compatibility | Rub-up | Compatibility | Rub-up |
| 8900 | White | Pass 6 | None | Pass 9 | None |
| 8913 | Organic Yellow | Pass 9 | None | Pass 9 | None |
| 8915 | Medium Yellow | Pass 6 | Slight dark | Pass 9 | None |
| 8916 | Durable Yellow | Pass 9 | None | Pass 9 | None |
| 8920 | Phthalo Green | Fail 3 | Severe dark | Pass 6 | Slight dark |
| 8930 | Phthalo Blue | Fail 1 | Severe dark | Pass 9 | None |
| 8935 | Red Iron Oxide | Pass 9 | None | Pass 9 | None |
| 8942 | Interior Red | Pass 6 | Slight dark | Pass 9 | None |
| 8951 | Exterior Red | Fail 3 | Mod dark | Pass 6 | Slight dark |
| 8964 | Orange | Pass 6 | Slight dark | Pass 6 | None |
| 8978 | Yellow Iron Oxide | Pass 6 | None | Pass 6 | None |
| 8983 | Magenta | Fail 3 | Severe dark | Pass 6 | Slight dark |
| 8988 | Raw Umber | Fail 3 | Mod dark | Pass 6 | Slight dark |
| 8991 | Lamp Black | Fail 3 | Mod dark | Pass 9 | None |

The results in Table V and Table VI show that in nearly all instances, addition of the synergist significantly lessened the susceptibility to rub up of the water-only fluid colorants with the alkyd base paint and the oil-based stain. When tinting the alkyd base paint using the Phthalo green colorant, somewhat more synergist than that employed in Table V may be desirable.

Example 3

Using the method of Example 2, NOVOCOLOR HP 8900 water-only fluid colorants from The Valspar Corporation were tested without and with a synergist in WEATHER-SHIELD alkyd base paint from Kelly-Moore Co. The results are shown below in Table VII:

TABLE VII

| | | 2 oz. (59 mL) water-only colorant per gallon (3.8 L) of tinted base No synergist | | 2 oz. (59 mL) water-only colorant per gallon (3.8 L) of tinted base 2 oz. (59 mL) synergist | |
|---|---|---|---|---|---|
| Colorant | Color | Tint strength | Rub-up | Tint strength | Rub-up |
| 8920 | Phthalo Green | 101.74 | Mod dark | 101.36 | Slight dark |
| 8930 | Phthalo Blue | 99.25 | Severe dark | 102.01 | Slight dark |
| 8951 | Exterior Red | 101.22 | None | 101.76 | None |
| 8991 | Lamp Black | 103.39 | Mod dark | 101.02 | None |

The results in Table VII show that in most instances, addition of the synergist significantly lessened the susceptibility to rub up of the water-only fluid colorants with the alkyd base paint. Rub-up was not observed when adding 2 oz. of the Exterior Red colorant, but the synergist resulted in an increase in tint strength.

Example 4

Using the method of Example 2, NOVOCOLOR HP 8900 water-only fluid colorants from The Valspar Corporation were tested without and with a synergist in PERMO-PAVE™ alkyd base paint from Wattyl Australia Pty. Ltd. The results are shown below in Table VIII:

TABLE VIII

| | | 2 oz. (59 mL) water-only colorant per gallon (3.8 L) of tinted base No synergist | | 2 oz. (59 mL) water-only colorant per gallon (3.8 L) of tinted base 2 oz. (59 mL) synergist | |
|---|---|---|---|---|---|
| Colorant | Color | Tint strength | Rub-up | Tint strength | Rub-up |
| 8920 | Phthalo Green | 96.81 | Severe dark | 101.09 | Mod dark |
| 8930 | Phthalo Blue | 98.38 | Severe dark | 101.34 | Mod dark |
| 8951 | Exterior Red | 115.47 | Severe dark | 101.58 | None |
| 8991 | Lamp Black | 97.81 | Severe dark | 106.44 | Slight dark |

The results in Table VIII show that in all instances, addition of the synergist significantly lessened the susceptibility to rub up of the water-only fluid colorants with the alkyd base paint.

Example 5

Using the method of Example 2, NOVOCOLOR HP 8900 water-only fluid colorants from The Valspar Corporation were tested without and with a synergist in ACE GREAT FINISHES oil-based wood stain from Ace Hardware Corp. The results are shown below in Table IX:

TABLE IX

| Colorant | Color | 2 oz. (59 mL) water-only colorant per gallon (3.8 L) of tinted base No synergist | | 2 oz. (59 mL) water-only colorant per gallon (3.8 L) of tinted base 2 oz. (59 mL) synergist | |
|---|---|---|---|---|---|
| | | Compatibility | Rub-up | Compatibility | Rub-up |
| 8920 | Phthalo Green | Fail 3 | Mod dark | Fail 3 | Mod dark |
| 8930 | Phthalo Blue | Fail 1 | Severe dark | Fail 3 | Mod dark |
| 8951 | Exterior Red | Fail 1 | Severe dark | Fail 3 | Mod dark |
| 8991 | Lamp Black | Fail 3 | Mod dark | Pass 6 | Slight dark |

The results in Table IX show that in most instances, addition of the synergist lessened the susceptibility to rub up of the water-only fluid colorants with the oil-based stain. Adjustment of the synergist amount or synergist ingredients should provide further improvements.

Example 6

Using the method of Example 2, NOVOCOLOR HP 8900 water-only fluid colorants from The Valspar Corporation were tested without and with a synergist in MCCORMICK oil-based wood stain from McCormick Paints. The results are shown below in Table X:

TABLE X

| Colorant | Color | 2 oz. (59 mL) water-only colorant per gallon (3.8 L) of tinted base No synergist | | 2 oz. (59 mL) water-only colorant per gallon (3.8 L) of tinted base 2 oz. (59 mL) synergist | |
|---|---|---|---|---|---|
| | | Compatibility | Rub-up | Compatibility | Rub-up |
| 8920 | Phthalo Green | Fail 1 | Severe dark | Fail 3 | Mod dark |
| 8930 | Phthalo Blue | Fail 1 | Severe dark | Fail 3 | Mod dark |
| 8951 | Exterior Red | Fail 1 | Severe dark | Pass 6 | Slight dark |
| 8991 | Lamp Black | Fail 1 | Severe dark | Pass 6 | Slight dark |

The results in Table X show that in all instances, addition of the synergist lessened the susceptibility to rub up of the water-only fluid colorants with the oil-based stain.

Example 7

Using the method of Example 1, ECOTONER water-only fluid colorants from Sherwin-Williams were tested without and with a synergist in No. 245A320 Ace Royal polyurethane alkyd enamel. The results are shown below in Table XI:

TABLE XI

| Colorant | Color | 4 oz. (118 mL) water-only colorant per gallon (3.8 L) of tinted base No synergist | | 4 oz. (118 mL) water-only colorant per gallon (3.8 L) of tinted base 2 oz. (59 mL) synergist | |
|---|---|---|---|---|---|
| | | Tint strength | Rub-up | Tint strength | Rub-up |
| New Red | Interior Red | 101.43 | Severe dark | 100.32 | Mod dark |
| Black | Lamp Black | 84.48 | Severe dark | 94.55 | Mod dark |
| Blue | Phthalo Blue | 89.21 | Severe dark | 102.20 | Mod dark |
| New Green | Phthalo Green | 97.48 | Severe dark | 100.57 | Mod dark |
| Yellow | Organic Yellow | 70.67 | Severe dark | 99.99 | Slight dark |

The results in Table XI show that in all instances, addition of the synergist significantly lessened the susceptibility to rub up of the water-only fluid colorants with the alkyd base paint. In most instances, the synergist also increased tint strength.

Example 8

Using the method of Example 1, GENNEX water-only fluid colorants from Benjamin Moore were tested without and with a synergist in No. 245A320 Ace Royal polyurethane alkyd enamel. The results are shown below in Table XII:

TABLE XII

| Colorant | Color | 4 oz. (118 mL) water-only colorant per gallon (3.8 L) of tinted base No synergist | | 4 oz. (118 mL) water-only colorant per gallon (3.8 L) of tinted base 2 oz. (59 mL) synergist | |
|---|---|---|---|---|---|
| | | Tint strength | Rub-up | Tint strength | Rub-up |
| 229-R2 Red | Interior Red | 99.79 | Severe dark | 99.53 | Slight dark |
| 229-S1 Black | Lamp Black | 92.84 | Mod dark | 103.62 | Mod dark |
| 229-B1 Blue | Phthalo Blue | 97.96 | Severe dark | 104.45 | Mod dark |
| 229-G1 Green | Phthalo Green | 100.23 | Mod dark | 107.77 | Slight dark |
| 229-Y2 Yellow | Organic Yellow | 95.85 | Severe dark | 98.05 | Slight dark |

The results in Table XII show that in most instances, addition of the synergist significantly lessened the susceptibility to rub up of the water-only fluid colorants with the alkyd base paint. In most instances, the synergist also increased tint strength.

Example 9

Using the method of Example 1, ECOTONER water-only fluid colorants from Sherwin-Williams were tested without and with a synergist in No. 0306 Cabot Semi-Transparent deck and siding stain. The results are shown below in Table XIII:

TABLE XIII

| Colorant | Color | 12 oz. (355 mL) water-only colorant per gallon (3.8 L) of tinted base No synergist | | 12 oz. (355 mL) water-only colorant per gallon (3.8 L) of tinted base 2 oz. (59 mL) synergist | |
|---|---|---|---|---|---|
| | | Compatibility | Rub-up | Compatibility | Rub-up |
| New Red | Interior Red | Fail 1 | Severe dark | Pass 6 | Slight dark |
| Black | Lamp Black | Fail 1 | Severe dark | Pass 6 | Slight dark |
| Blue | Phthalo Blue | Fail 1 | Severe dark | Fail 3 | Mod dark |
| New Green | Phthalo Green | Fail 1 | Severe dark | Pass 6 | None |
| Yellow | Organic Yellow | Fail 1 | Severe dark | Pass 6 | Slight dark |

The results in Table XIII show that in all instances, addition of the synergist significantly lessened the susceptibility to rub up of the water-only fluid colorants with the oil-based stain. When tinting the stain using the Phthalo green colorant, somewhat more synergist than that employed in Table XIII may be desirable.

Example 10

Using the method of Example 1, GENNEX water-only fluid colorants from Benjamin Moore were tested without and with a synergist in No. 0306 Cabot Semi-Transparent deck and siding stain. The results are shown below in Table XIV:

TABLE XIV

| Colorant | Color | 12 oz. (355 mL) water-only colorant per gallon (3.8 L) of tinted base No synergist | | 12 oz. (355 mL) water-only colorant per gallon (3.8 L) of tinted base 2 oz. (59 mL) synergist | |
|---|---|---|---|---|---|
| | | Compatibility | Rub-up | Compatibility | Rub-up |
| 229-R2 Red | Interior Red | Fail 1 | Severe dark | Pass 6 | Slight dark |
| 229-S1 Black | Lamp Black | Fail 1 | Severe dark | Pass 6 | None |
| 229-B1 Blue | Phthalo Blue | Fail 1 | Severe dark | Pass 6 | Slight dark |
| 229-G1 Green | Phthalo Green | Fail 1 | Severe dark | Fail 3 | Mod dark |
| 229-Y2 Yellow | Organic Yellow | Fail 1 | Severe dark | Pass 6 | Slight dark |

The results in Table XIV show that in all instances, addition of the synergist significantly lessened the susceptibility to rub up of the water-only fluid colorants with the oil-based stain. When tinting the stain using the Phthalo green colorant, somewhat more synergist than that employed in Table XIII may be desirable.

Example 11

The synergist formulation shown in Table II was neutralized with potassium hydroxide to lessen its acidity and lessen the likelihood that the synergist might cause corrosion or off-gassing in metal containers. The thus-modified synergist is shown below in Table XV:

TABLE XV

| Ingredient | Wt. % |
|---|---|
| Rhodacal VS1 Surfactant | 41.59 |
| Rhodafac RS-710 Surfactant | 31.15 |
| Dioctyl Maleate Cosolvent | 20.72 |
| Potassium Hydroxide | 6.65 |

The invention is further illustrated by the following embodiments:

1. A point-of-sale custom color system for tinting base paints and stains, the system comprising:
    a) an array of water-only fluid colorants including at least white, green, blue and red colorants, the colorants being packaged in containers with a volume of 0.5 to 5 L and from which colorant may be gravimetrically or volumetrically dispensed via an automated or manual colorant dispenser into the base paint or stain; and
    b) at least one synergist containing, primarily or exclusively, one or more ingredients that will disperse the water-only colorants into solvent-borne base paints or stains.

2. A system according to embodiment 1, further comprising at least one water-borne base paint or stain and at least one solvent-borne base paint or stain, the base paints or stains being packaged in largely but incompletely filled point-of-sale containers with a volume of 0.2 to 20 L equipped with an openable and recloseable lid, cap or other closure for an opening through which colorant may be dispensed from the automated or manual colorant dispenser into the base paint or stain.

3. A system according to embodiment 1, further comprising the automated or manual colorant dispenser.

4. A point-of-sale custom color system for tinting base paints and stains, the system comprising:
    a) an array of water-only fluid colorants including at least white, green, blue and red colorants, the colorants being packaged in containers with a volume of 0.5 to 5 L and from which colorant may be gravimetrically or volumetrically dispensed via an automated or manual colorant dispenser into the base paint or stain; and
    b) at least one water-borne base paint or stain and at least one solvent-borne base paint or stain, the base paints or stains being packaged in largely but incompletely filled point-of-sale containers with a volume of 0.2 to 20 L equipped with an openable and recloseable lid, cap or other closure for an opening through which colorant may be dispensed from the automated or manual colorant dispenser into the base paint or stain, wherein the solvent-borne base paint or stain includes a synergist in the form of one or more ingredients that will disperse the water-only colorants into such solvent-borne base paint or stain.

5. A system according to embodiment 4, further comprising the automated or manual colorant dispenser.

6. A method for point-of-sale custom paint or stain tinting, the method comprising using an automated or manual colorant dispenser to dispense into water-borne and solvent-borne base paints or stains at a retail, wholesale or combined retail/wholesale outlet one or more water-only fluid colorants selected from an array of colorants including at least white, black, red, green and blue water-only colorants, and further comprising adding to or including in the solvent-borne base paints or stains at least one synergist containing one or more ingredients that will disperse the water-only colorants into such solvent-borne base paints or stains.

7. A method according to embodiment 6, wherein the synergist is added to the solvent-borne base paint or stain before dispensing any of the one or more water-only fluid colorants into such solvent-borne base paint or stain.

8. A system according to embodiment 4 or method according to embodiment 6, wherein the solvent-borne base paints or stains do not already include sufficient ingredients from the synergist to disperse the water-only fluid colorants into such solvent-borne base paint or stains without causing objectionable rub-up.

9. A system according to embodiment 4 or method according to embodiment 6, wherein the synergist is included in the solvent-borne base paint or stain.

10. A system or method according to any preceding embodiment, wherein the synergist is disposed in one or more tinting machine dispenser slots normally reserved for a colorant, and dispensed into the base paint or stain using a tinting machine metering circuit.

11. A system or method according to any preceding embodiment, wherein water-only fluid colorants are used whenever tinting a water-borne base paint or stain, and water-only fluid colorants and the synergist are used whenever tinting a solvent-borne base paint or stain.

12. A system or method according to any preceding embodiment, wherein the array includes one or more yellow and one or more colored oxide colorants.

13. A system or method according to any preceding embodiment, wherein the synergist comprises a surfactant, optional dispersing agent and optional cosolvent.

14. A system or method according to any preceding embodiment, wherein the synergist comprises a combination of two or more surfactants that provides improved compatibility across a range of base paints or stains or within an array of water-only fluid colorants.

15. A system or method according to any preceding embodiment, wherein the synergist comprises a nonionic surfactant.

16. A system or method according to any preceding embodiment, wherein the synergist comprises dioctyl maleate, tributyl citrate, a dihydric or polyhydric alcohol, a polyether, a modified polyurea, a polyalkylene oxide or a combination thereof.

17. A system or method according to any preceding embodiment, wherein the synergist comprises a compound having the formula I shown below:

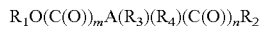

$$R_1O(C(O))_mA(R_3)(R_4)(C(O))_nR_2 \quad \text{I}$$

wherein: A is a divalent $C_1$-$C_{10}$ alkyl, $C_2$-$C_{10}$ alkenyl or $C_3$-$C_{10}$ cycloalkyl radical;

$R_3$ and $R_4$ are independently H, substituted or unsubstituted $C_1$-$C_6$ alkyl, substituted or unsubstituted $C_3$-$C_6$ cycloalkyl, —$OR_5$ or $C(O)OR_5$ radicals, wherein $R_5$ is H or a substituted or unsubstituted $C_1$-$C_6$ alkyl, substituted or unsubstituted $C_3$-$C_6$ cycloalkyl, or $C_1$-$C_6$ alkoxy radical;

$R_1$ and $R_2$ are independently H, —C=O, or a substituted or unsubstituted $C_1$-$C_6$ alkyl radical;

m is 0 or 1; and n is 0 or 1.

18. A system or method according to any preceding embodiment, wherein the synergist comprises a dispersing agent.

19. A system or method according to any preceding embodiment, wherein the synergist comprises a cosolvent.

20. A system or method according to any preceding embodiment, wherein at least 50 wt. % of the synergist comprises surfactant and optional dispersing agent or cosolvent.

21. A system or method according to any preceding embodiment, wherein at least 80 wt. % of the synergist comprises surfactant and optional dispersing agent or cosolvent.

22. A system or method according to any preceding embodiment, wherein at least 90 wt. % of the synergist comprises surfactant and optional dispersing agent or cosolvent.

23. A system or method according to any preceding embodiment, wherein the synergist consists essentially of a surfactant, dispersing agent, cosolvent and an optional rheology modifier.

24. A system or method according to any preceding embodiment, wherein the synergist is contained in a metal or plastic box, can, cartridge, jar, pouch, squeeze bottle, syringe or collapsible tube.

25. A system or method according to any preceding embodiment, wherein the amount and type of synergist added to the solvent-borne base paint or stain is the same whenever a solvent-borne base paint or stain is tinted.

26. A system or method according to any preceding embodiment, wherein the amount or type of synergist added to the solvent-borne base paint or stain varies depending on the amount of colorant to be dispensed.

27. A system or method according to any preceding embodiment, wherein the amount or type of synergist added to the solvent-borne base paint or stain varies depending on the colorant to be dispensed.

28. A system or method according to any preceding embodiment, wherein the amount or type of synergist added to the solvent-borne base paint or stain varies depending on the solvent-borne base paint or stain to be tinted.

29. A system or method according to any preceding embodiment, wherein all of the colorants in the array and in the colorant dispenser are water-only fluid colorants.

30. A system or method according to any preceding embodiment, wherein less than two of the colorants in the array and in the colorant dispenser are compatible with alkyd paints and stains, and the remaining colorants in the array will exhibit visually objectionable rub-up if dispensed into such alkyd paints and stains in representative tinting amounts of 1 to 15% of the alkyd paint or stain container volume.

31. A system or method according to any preceding embodiment, wherein the solvent-borne base paint or stain is a paint.

32. A system or method according to any preceding embodiment, wherein the solvent-borne base paint or stain comprises an alkyd paint.

33. A system or method according to any preceding embodiment, wherein the solvent-borne base paint or stain comprises a polyurethane paint.

34. A system or method according to any preceding embodiment, wherein the solvent-borne base paint or stain comprises an epoxy paint.

35. A system or method according to any preceding embodiment, wherein the solvent-borne base paint or stain is an oil-based stain.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A tinted solvent-borne base paint or stain comprising:
one or more polymeric binders,
one or more pigments or dyes,
one or more vehicles or carriers,
at least one synergist, and
one or more water-only fluid colorants from an array of water-only fluid colorants, dispersed throughout the solvent-borne base paint or stain,
wherein the one or more water-only colorants provides a compatibly tinted base paint or stain, and
wherein the tinted solvent-borne base paint or stain exhibits at most a moderate dark rating in a Rub-Up Test when the tinted solvent-borne base paint or stain includes 4 oz of the one or more water-only fluid colorant and 2 oz of the at least one synergist in one gallon of the tinted solvent-borne base paint or stain.

2. The tinted solvent-borne base paint or stain according to claim 1, wherein the one or more polymer binders comprises a solution polymer.

3. The tinted solvent-borne base paint or stain according to claim 1, wherein the one or more polymer binders comprises an alkyd resin.

4. The tinted solvent-borne base paint or stain according to claim 1, wherein the one or more polymer binders comprises a polyurethane.

5. The tinted solvent-borne base paint or stain according to claim 1, wherein the one or more polymer binders comprises an epoxy ester.

6. The tinted solvent-borne base paint or stain according to claim 1, wherein the one or more polymer binders comprises an acrylic polymer.

7. The tinted solvent-borne base paint or stain according to claim 1, wherein the one or more polymer binders comprises an acrylic copolymer.

8. The tinted solvent-borne base paint or stain according to claim 1, wherein the one or more polymer binders comprises a silicone.

9. The tinted solvent-borne base paint or stain according to claim 1, wherein the one or more polymer binders comprises a polyester.

10. The tinted solvent-borne base paint or stain according to claim 1, wherein the one or more polymer binders represents about 5 to about 99 volume percent of the tinted solvent-borne base paint or stain volume when the tinted solvent-borne base paint or stain is applied as a coating and dried, cured or otherwise hardened, measured as volume percent of dried, cured, or hardened coating volume.

11. The tinted solvent-borne base paint or stain according to claim 1, wherein the one or more polymer binders has a glass transition temperature of about −20° C. to about 60° C.

12. The tinted solvent-borne base paint or stain according to claim 1, wherein the one or more pigments or dyes comprises a treated or untreated organic pigment or dye.

13. The tinted solvent-borne base paint or stain according to claim 1, wherein the one or more pigments or dyes comprises a treated or untreated inorganic pigment or dye.

14. The tinted solvent-borne base paint or stain according to claim 1, wherein the one or more pigments or dyes comprises a metallic oxide, metallic flake, carbon black, azo pigment, benzimidazolinone, carbazole, indanthrone, isoindolinone, isoindolone, perylene, phthalocyanine, quinacridone, thioindigio red, or a mixture thereof.

15. The tinted solvent-borne base paint or stain according to claim 1, wherein the one or more vehicles or carriers comprises one or more of mineral spirits, xylene, ketones, glycol ethers, organic esters, alcohols and ethylene or propylene glycols.

16. The tinted solvent-borne base paint or stain according to claim 1, wherein the solvent-borne base paint or stain comprises at least about 20 and up to about 50 wt % of the one or more vehicles or carriers based on a total tinted solvent-borne base paint or stain weight.

17. The tinted solvent-borne base paint or stain according to claim 1, further comprising a reactive diluent or reactive resin.

18. The tinted solvent-borne base paint or stain according to claim 17, wherein the reactive diluent or reactive resin comprises a polymerizable monomer, vinyl resin, acrylic resin, epoxy resin, oligomer, polyether polyol, or low molecular weight polyfunctional resin.

19. The tinted solvent-borne base paint or stain according to claim 1, wherein the at least one synergist comprises one or more surfactants.

20. The tinted solvent-borne base paint or stain according to claim 1, wherein the at least one synergist comprises one or more dispersing agents.

21. The tinted solvent-borne base paint or stain according to claim 1, wherein the at least one synergist comprises one or more cosolvents.

22. The tinted solvent-borne base paint or stain according to claim 1, wherein the at least one synergist comprises a combination of two or more surfactants that provides improved compatibility across a range of base paints or stains containing different polymeric binders or across an array of white, black, red, green and blue water-only fluid colorants.

23. The tinted solvent-borne base paint or stain according to claim 1, wherein the at least one synergist comprises a nonionic surfactant.

24. The tinted solvent-borne base paint or stain according to claim 1, wherein the at least one synergist comprises dioctyl maleate, tributyl citrate, a dihydric or polyhydric alcohol, a polyether, a modified polyurea, a polyalkylene oxide or a combination thereof.

25. The tinted solvent-borne base paint or stain according to claim 1, wherein the at least one synergist comprises a compound having the formula I shown below:

$$R_1O(C(O))_mA(R_3)(R_4)(C(O))^nR^2 \qquad \text{I}$$

wherein:
A is a divalent $C_1$-$C_{10}$ alkylene, $C_2$-$C_{10}$ alkylenyl or $C_3$-$C_{10}$ cycloalkylene radical;
$R_3$ and $R_4$ are independently H, substituted or unsubstituted $C_1$-$C_6$ alkyl, substituted or unsubstituted $C_3$-$C_6$ cycloalkyl, —$OR_5$ or $C(O)OR_5$ radicals, wherein $R_5$ is H or a substituted or unsubstituted $C_1$-$C_6$ alkyl, substituted or unsubstituted $C_3$-$C_6$ cycloalkyl, or $C_1$-$C_6$ alkoxy radical;
$R_1$ and $R_2$ are independently H, or a substituted or unsubstituted $C_1$-$C_6$ alkyl radical;
m is 0 or 1; and
n is 0 or 1.

26. The tinted solvent-borne base paint or stain according to claim 1, further comprising a component or components of a multicomponent reactive system for the one or more polymer binders.

27. The tinted solvent-borne base paint or stain according to claim 26, wherein the multicomponent reactive system comprises an isocyanate-polyamine, isocyanate-polyol, epoxy-polyamine, carbodiimide-polyacid, aziridine-polyacid, melamine-polyol, or urea formaldehyde-polyol system.

28. The tinted solvent-borne base paint or stain according to claim 1, further comprising one or more rheology modifiers or thickeners.

29. A tinted solvent-borne base paint or stain according to claim 1, further comprising one or more adjuvants selected from adhesion promoters, antioxidants, biocides, buffers, coalescing agents, defoamers, dispersants, dyes, extender fillers, humectants, leveling agents, neutralizers, optical brighteners, pearlescents, plasticizers, polymeric additives, preservatives, reactive diluents, tackifiers, ultraviolet stabilizers or waxes.

30. The tinted solvent-borne base paint or stain according to claim 1, wherein the one or more water-only colorants comprise at least one or more white, black, red, green or blue water-only colorants.

31. The tinted solvent-borne base paint or stain according to claim 1, wherein the tinted solvent-borne base paint or stain exhibits at most a moderate dark rating in the Rub-Up Test when the colorant is each of white, black, red, green and blue water-only colorants.

\* \* \* \* \*